United States Patent
Jung et al.

(10) Patent No.: US 12,436,499 B2
(45) Date of Patent: Oct. 7, 2025

(54) DISPLAY DEVICE

(71) Applicant: Samsung Display Co., LTD., Yongin-si (KR)

(72) Inventors: Ji Won Jung, Yongin-si (KR); Guanghai Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/659,340

(22) Filed: May 9, 2024

(65) Prior Publication Data
US 2025/0060701 A1 Feb. 20, 2025

(30) Foreign Application Priority Data
Aug. 17, 2023 (KR) .................... 10-2023-0107396

(51) Int. Cl.
*G03H 1/02* (2006.01)
*G09G 3/3233* (2016.01)
(Continued)

(52) U.S. Cl.
CPC ............. *G03H 1/02* (2013.01); *G09G 3/3233* (2013.01); *H10K 59/121* (2023.02);
(Continued)

(58) Field of Classification Search
USPC ........................................................... 348/40
See application file for complete search history.

(56) References Cited

U.S. PATENT DOCUMENTS 6,509,574 B2   1/2003   Yuan et al.
8,400,695 B2   3/2013   Kroll et al.
(Continued)

FOREIGN PATENT DOCUMENTS

KR   10-2021-0156382   12/2021
KR   10-2024-0144731   10/2024

OTHER PUBLICATIONS

Hayashi et al., "Suppression of roll-off characteristics of organic light-emitting diodes by narrowing current injection/transport area to 50 nm", Applied Physics Letters, Mar. 2, 2015, pp. 093301; 1-5, vol. 106.

(Continued)

*Primary Examiner* — Nigar Chowdhury
(74) *Attorney, Agent, or Firm* — CANTOR COLBURN LLP

(57) ABSTRACT

A display device includes at least one spatial light modulator displaying an image, a surface light source device providing an image display light from a rear direction of the spatial light modulator to the spatial light modulator, and at least one image transmission member forming a display path of an image displayed through at least one spatial light modulator, the surface light source device comprises an organic light emitting display surface in which light emitting pixels performing a surface light emission are disposed, and an emission driving circuit setting a light emission compensation value for the each of the block areas according to an average value of light emission grayscale deviation for each of the block areas of the organic light emitting display surface and compensating light emission grayscale in respect to the light emitting pixels by using the light emission compensation value for each of the block areas.

18 Claims, 16 Drawing Sheets

(51) Int. Cl.
*H10K 59/121* (2023.01)
*G03H 1/00* (2006.01)

(52) U.S. Cl.
CPC ............. *G03H 2001/0088* (2013.01); *G03H 2001/0224* (2013.01); *G09G 2320/0233* (2013.01)

(56) References Cited

U.S. PATENT DOCUMENTS

| | | |
|---|---|---|
| 2006/0291769 A1 | 12/2006 | Spoonhower et al. |
| 2019/0320512 A1* | 10/2019 | Zhang ................... F21V 33/00 |
| 2019/0340977 A1* | 11/2019 | Park ..................... G09G 3/3275 |
| 2019/0392769 A1* | 12/2019 | Lee ...................... G09G 3/3225 |
| 2024/0324297 A1 | 9/2024 | Jung et al. |

OTHER PUBLICATIONS

Peng et al., "Speckle-free holography with partially coherent light sources and camera-in-the-loop calibration", Science Advances, Nov. 12, 2021, pp. 1-6, vol. 7.

* cited by examiner

DISPLAY DEVICE

CROSS-REFERENCE TO RELATED APPLICATION(S)

This application claims priority to and benefits of Korean Patent Application No. 10-2023-0107396 under 35 U.S.C. § 119, filed on Aug. 17, 2023, in the Korean Intellectual Property Office, the entire contents of which are incorporated herein by reference.

BACKGROUND

1. Technical Field

The disclosure relates to a display device.

2. Description of the Related Art

Recently, as electronic devices and display devices that can implement virtual reality (VR) are developed, technologies that can realize augmented reality (AR), mixed reality (MR), and extended reality content images such as holograms have also been researched as a next step of virtual reality.

Unlike virtual reality that is based on a completely virtual world, augmented reality is a display technology that further increases the reality effect by superimposing virtual objects or image information on a real-world environment. Stereoscopic imaging technology using a hologram method can fundamentally avoid fatigue that occurs in a conventional stereoscopic method in which stereoscopic images are seen using binocular disparity. Therefore, the stereoscopic imaging technology using the hologram method is drawing a lot of attention as a next-generation stereoscopic imaging technology that should be ultimately reached.

In the case of extended reality content images such as holograms, since an actual image formed is directly seen with the eyes without using an optical illusion, a 3D effect that is no different from seeing a real thing can be felt. Therefore, the extended reality content images have the advantage that even watching them for a long time does not cause fatigue.

A method of displaying an extended reality content image such as a hologram essentially uses a spatial light modulator, and the performance of the spatial light modulator acts as an important factor that determines the 3D effect and performance. Recently, a liquid crystal display panel has been employed as a spatial light modulator. Accordingly, the emission structure of a light emitting panel utilized as a background light source such as a backlight also acts as an important factor that determines the display quality and viewing angle of an extended reality content image.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device capable of improving a light emitting pixel arrangement structure and a surface light emission driving method of a surface light source device which is used as a backlight of a spatial light modulator and displaying an extended reality content image such as a hologram by using surface light source of ultra-low resolution.

Aspects of the disclosure also provide a display device capable of controlling light emitting operation of light emitting pixels for each emission area by compensating and correcting grayscale deviation or brightness deviation of a display image.

However, aspects of the disclosure are not restricted to the ones set forth herein. The above and other aspects of the disclosure will become more apparent to one of ordinary skill in the art to which the disclosure pertains by referencing the detailed description of the disclosure given below.

According to an embodiment of the disclosure, a display device may include at least one spatial light modulator displaying an image; a surface light source device providing an image display light from a rear direction of the at least one spatial light modulator to the spatial light modulator as a background light; and at least one image transmission member forming a display path of an image displayed through at least one spatial light modulator, wherein the surface light source device comprises an organic light emitting display surface in which a plurality of light emitting pixels performing a surface light emission are disposed, and an emission driving circuit setting a light emission compensation value for the each of the block areas of the organic light emitting display surface according to an average value of light emission grayscale deviation for each of the block areas of the organic light emitting display surface and compensating light emission grayscale in respect to the plurality of light emitting pixels by using the light emission compensation value for each of the block areas for driving.

The display device of claim 1, wherein the emission driving circuit may generate gate control signals and analog light emitting pixel voltages for driving the plurality of light emitting pixels simultaneously in at least one frame, and wherein the gate control signals are supplied to a first gate driver in the at least one frame, and the analog light emitting pixel voltages are supplied simultaneously to the plurality of light emitting pixels.

The plurality of light emitting pixels may comprises a plurality of pixel drivers receiving gate control signals at a same timing; and light emitting elements emitting light by at least one pixel driver among the plurality of pixel drivers, and the plurality of pixel drivers are supplied with the gate control signals and the light emitting pixel voltage from the emission driving circuit at a same timing and emits light of the light emitting elements simultaneously.

The light emitting elements may be electrically connected in parallel to the plurality of the pixel drivers to emit light by drive of the plurality of pixel drivers, and the plurality of pixel drivers are supplied with the same gate control signals and the same analog light emitting pixel voltages through the emission driving circuit and the first gate driver at a same driving timing to emit light of the light emitting elements.

Each of the light emitting elements included in the plurality of light emitting pixels may be disposed on the organic light emitting display surface in at least any one of a substantially concentric circle shape, a substantially sector shape, a substantially triangular shape, a substantially rhombus shape, a substantially quadrangular shape, a substantially circular shape, a substantially semicircular shape, and a substantially elliptical shape or formed in a combination of different shapes.

Each of the light emitting elements included in the plurality of light emitting pixels may be disposed in a substantially concentric circle shape in plan view, surrounding the center of the organic light emitting display surface or is disposed in a substantially quadrangular shape in plan view, surrounding the center of the of the organic light emitting display surface in substantially quadrangular shape.

At least three light emitting pixels may respectively display red, green, and blue lights form each of unit light emitting pixels emitting white light, each of the unit light emitting pixels may be alternately and repetitively disposed on the organic light emitting display surface, and in each of the unit light emitting pixels, at least three light emitting pixels formed in at least one of a substantially concentric circle shape, a substantially sector shape, a substantially triangular shape, a substantially rhombus shape, a substantially rectangular shape, and a substantially square shape are combined with each other.

The emission driving circuit may receive an average value of light emission grayscale for each block area in respect to the block areas of the organic light emitting display surface from an external light emitting detection device, generates a light emission compensation value for each block area according to the light emission grayscale average value deviation for each block area of the organic light emitting display surface, compensates a grayscale value of extended reality content image data for each block area with the light emission compensation value for each block area, and converts into an analog light emitting pixel voltage and supply the analog light emitting voltage to the plurality of light emitting pixels.

The emission driving circuit may comprise a light emitting pixel data alignment part aligning the extended reality content image data for at least one light emitting pixel of a horizontal line unit of the organic light emitting display surface or each light emitting pixel; a light emitting compensation data storage part receiving an average value of light emission grayscale or brightness value for each block area detected by the light emitting detection device and generating the light emission compensation value for each block area to correspond respectively to the average value of light emission grayscale deviation or brightness value for each block area; a first data compensation part sequentially calculating the light emission compensation value for each block area on the extended reality content image data for each light emitting pixel in a preset calculation method to generate a compensation image data for each light emitting pixel; and a light emitting data voltage generator converting compensation image data for each light emitting pixel with compensated light emission compensation value into an analog light emitting pixel voltage and supplying the analog light emitting pixel voltage to the light emitting pixels.

The at least one spatial light modulator may comprise a liquid crystal image display part displaying extended reality content image through at least one image transmission member using a background light provided from the surface light source device; and a display driving circuit setting an image grayscale compensation value for each block area according to a grayscale average value deviation for each block area of the liquid crystal image display part and compensating the image grayscale in respect to liquid pixels aligned in the liquid crystal image display part to drive the liquid crystal pixels by using the image grayscale compensation value for each block area.

The display driving circuit may receive a grayscale average value of display image for each block area in respect to the block areas of the liquid crystal image display part from an external light emitting detection device, generates image grayscale compensation value for each block area according to a grayscale average value deviation of for each block area of the liquid crystal image display part, compensates a grayscale value of extended reality content image data for each block area with an image grayscale compensation value for each block area, and converts into an analog image signal and supply the analog image signal to liquid pixels of the liquid crystal image display part.

The display driving circuit may comprise a line data alignment part aligning extended reality content image data for at least one liquid crystal pixel of a horizontal line part of the liquid crystal image display part or each of the liquid crystal pixels; a compensation data setting part generating and storing the grayscale compensation value for each block area to respectively correspond to a deviation of a brightness value or an image display grayscale average value for each block area; a second data compensation part calculating the grayscale compensation value for each block area on the extended reality content image data for each liquid crystal pixel in a preset calculation method to generate a compensation image data for each liquid crystal pixel; and a data voltage output part converting a corrected image data for each liquid crystal pixel, for which the grayscale compensation value has been compensated, into an analog image signal and supplying the analog image signal to the liquid crystal pixels.

According to an embodiment of the disclosure, a display device may include at least one spatial light modulator displaying an image; a surface light source device providing an image display light from a rear direction of the at least one spatial light modulator to the at least one spatial light modulator as a background light; and at least one image transmission member forming a display path of an image displayed through at least one spatial light modulator, wherein the at least one spatial light modulator comprises a liquid crystal image display part displaying extended reality content image through at least one image transmission member using a background light provided from the surface light source device, and a display driving circuit setting an image grayscale compensation value for each block area according to a grayscale average value deviation for each block area of the liquid crystal image display part and compensating the image grayscale in respect to liquid pixels aligned in the liquid crystal image display part to drive the liquid crystal pixels by using the image grayscale compensation value for each block area.

The display driving circuit may receive a grayscale average value of display image for each block area in respect to the block areas of the liquid crystal image display part from an external light emitting detection device, generates image grayscale compensation value for each block area according to a grayscale average value deviation of for each block area of the liquid crystal image display part, compensates a grayscale value of extended reality content image data for each block area with an image grayscale compensation value for each block area, and converts into an analog image signal and supply the analog image signal to liquid pixels of the liquid crystal image display part.

The display driving circuit may comprises a line data alignment part aligning the extended reality content image data for at least one liquid crystal pixel of a horizontal line part of the liquid crystal image display part or each of the liquid crystal pixels; a compensation data setting part generating and storing the grayscale compensation value for each block area to respectively correspond to a deviation of a brightness value or an image display grayscale average value for each block area; a second data compensation part calculating the grayscale compensation value for each block area on the extended reality content image data for each liquid crystal pixel in a preset calculation method to generate a compensation image data for each liquid crystal pixel; and a data voltage output part converting a corrected image data for each liquid crystal pixel, for which the grayscale compensation value has been compensated, into an analog image signal and supplying the analog image signal to the liquid crystal pixels.

The surface light source device may comprise an organic light emitting display surface in which a plurality of light emitting pixels performing surface emission is aligned; and an emission driving circuit setting a light emission compensation value for the each of the block areas according to the grayscale average value deviation of for each of the block areas of the organic light emitting display surface and compensating light emission grayscale in respect to the plurality of light emitting pixels by using the emission compensation value for each of the block areas for driving.

The emission driving circuit may receive an average value of light emission grayscale for each block area in respect to the block areas of the organic light emitting display surface from an external light emitting detection device, generates a light emission compensation value for each block area according to a light emission grayscale average value deviation for each block area of the organic light emitting display surface, compensates a grayscale value of extended reality content image data for each block area with the light emission compensation value for each block area, and converts into an analog light emitting pixel voltage and supply the analog light emitting voltage to the plurality of light emitting pixels.

The emission driving circuit may comprise a light emitting pixel data alignment part aligning the extended reality content image data for at least one light emitting pixel of horizontal line unit of the organic light emitting surface or each of the light emitting pixels; a light emitting compensation data storage part receiving an average value of light emission grayscale or brightness value for each block area detected by the light emitting detection device and generating the light emission compensation value for each block area to correspond respectively to the average value of light emission grayscale deviation or brightness value for each block area; a first data compensation part sequentially calculating the light emission compensation value for each block area on the extended reality content image data for each light emitting pixel in a preset calculation method to generate a compensation image data for each light emitting pixel; and a light emitting data voltage generator converting compensation image data for each light emitting pixel with compensated light emission compensation value into an analog light emitting pixel voltage and supplying the analog light emitting pixel voltage to the light emitting pixels.

According to an embodiment of the disclosure, a display device may improve a light emitting pixel arrangement structure and a surface light emission driving method of a surface light source device so as to provide background light of ultra-low resolution, thereby raising the driving efficiency and fabrication efficiency of a display device.

According to an embodiment, a display device may improve display quality of an extended reality content image such as a hologram by compensating and correcting grayscale deviation or brightness deviation of a display image.

However, the effects of the disclosure are not limited to the aforementioned effects, and various other effects are included in the disclosure.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EMBODIMENTS

Figure 1:
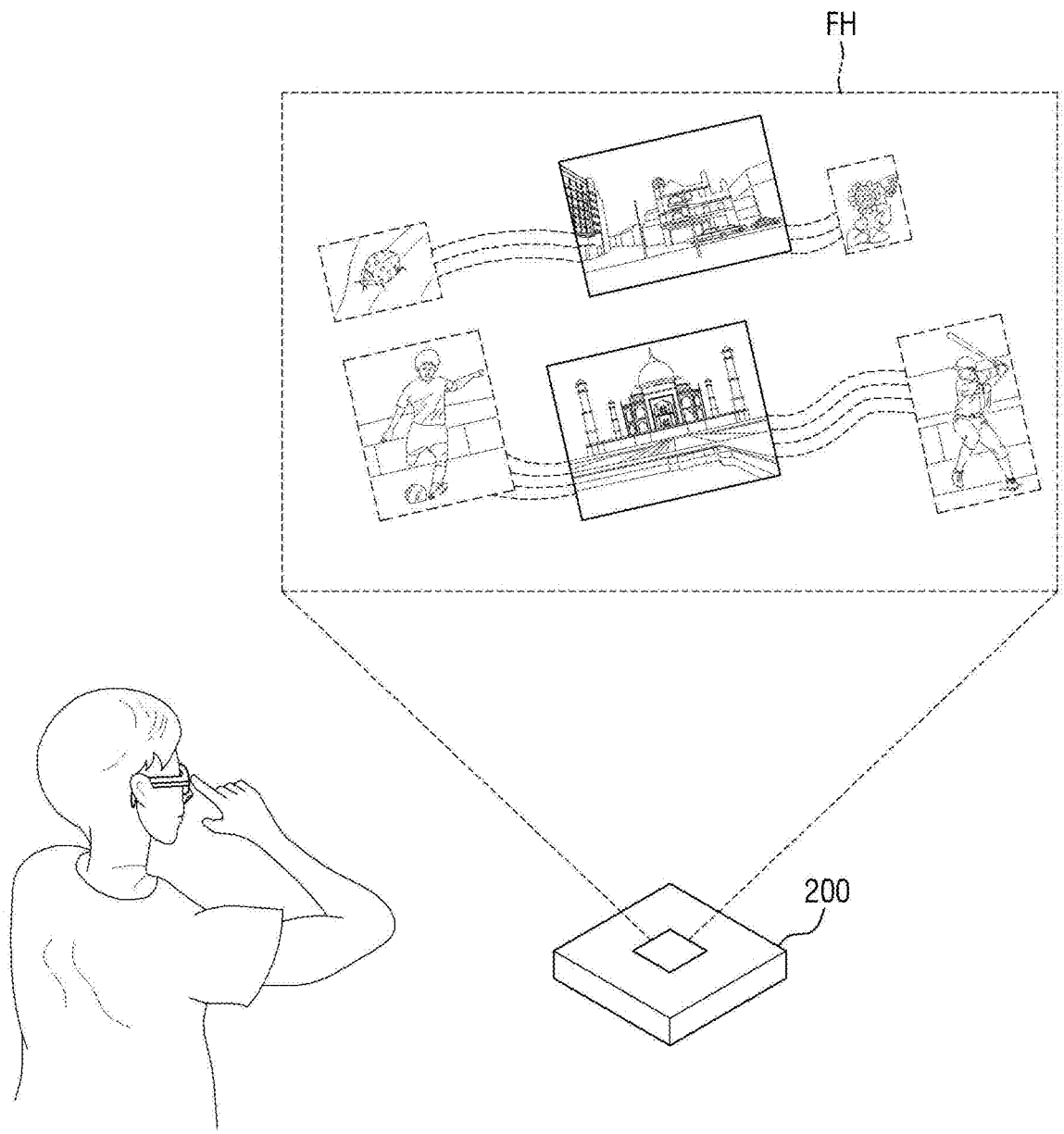
FIG. 1 illustrates a utilization example of a projector-type extended reality content image display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Each of the features of the various embodiments may be combined or combined with each other, in part or in whole, and technically various interlocking and driving are possible. Each embodiment may be implemented independently of each other or may be implemented together in an association.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Hereinafter, embodiments will be described with reference to the accompanying drawings.

Figure 2:
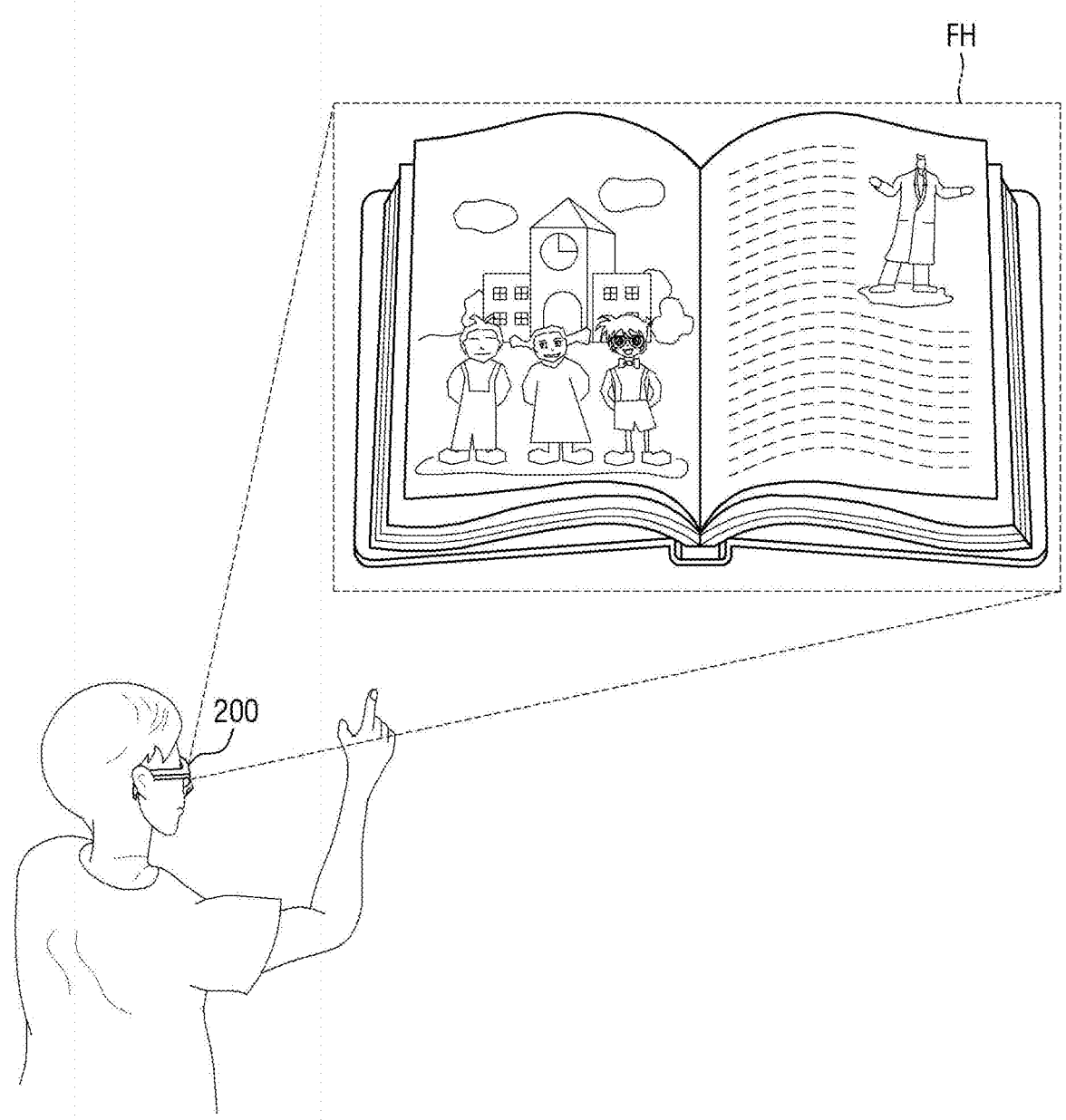
FIG. 2 illustrates a utilization example of a glasses-type extended reality content image display device according to an embodiment.

FIG. 1 illustrates a utilization example of a projector-type extended reality content image display device according to an embodiment. FIG. 2 illustrates a utilization example of a glasses-type extended reality content image display device according to an embodiment.

Referring to FIGS. 1 and 2, a display device 200 according to an embodiment for displaying an extended reality content image such as a hologram may be formed as a projector type that can be readily carried by a user and may be mounted or assembled in structures on a ceiling or a wall or in a given space.

The display device 200 according to the embodiment may be integral with a glasses-type frame that can be readily carried and worn or taken off by a user or may be mounted or assembled in the glasses-type frame.

In the disclosure, the display device 200 displays and provides an extended reality content image FH in a given space through a 3D lens or sheet, so that the extended reality content image FH such as a hologram can be recognized in a real space visible to a user's eyes. The extended reality content image FH may include 2D or 3D extended reality image content, which is a combination of graphic images, camera-photographed images and text images, and sound content.

Figure 3:
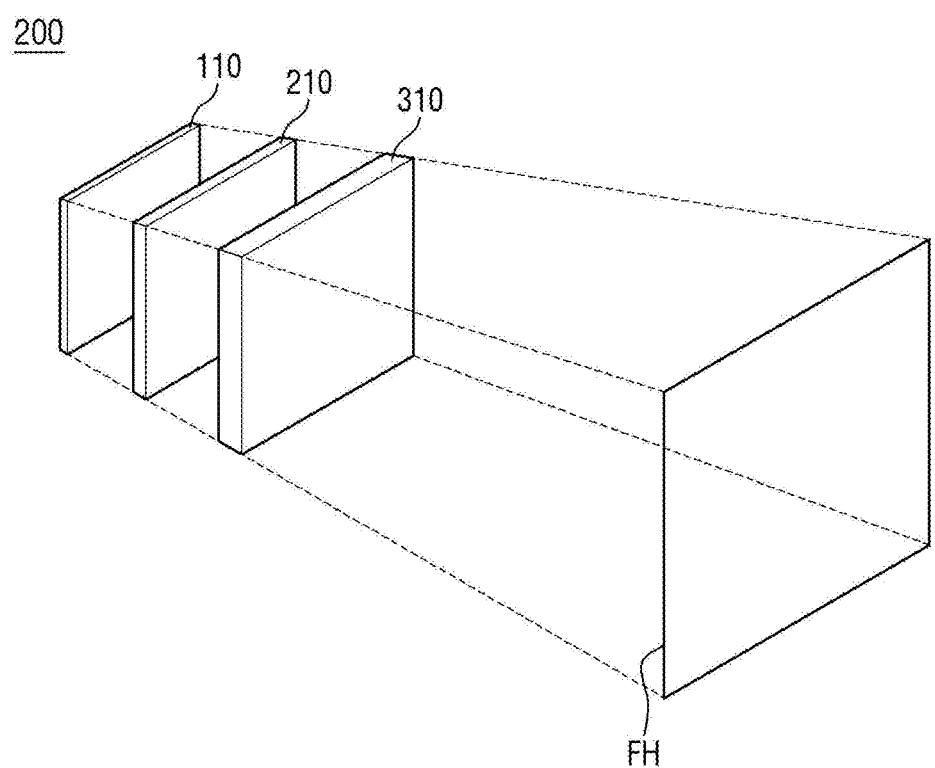
FIG. 3 is an exploded perspective view schematically illustrating the configuration of an extended reality content image display device according to a first embodiment.
Figure 4:
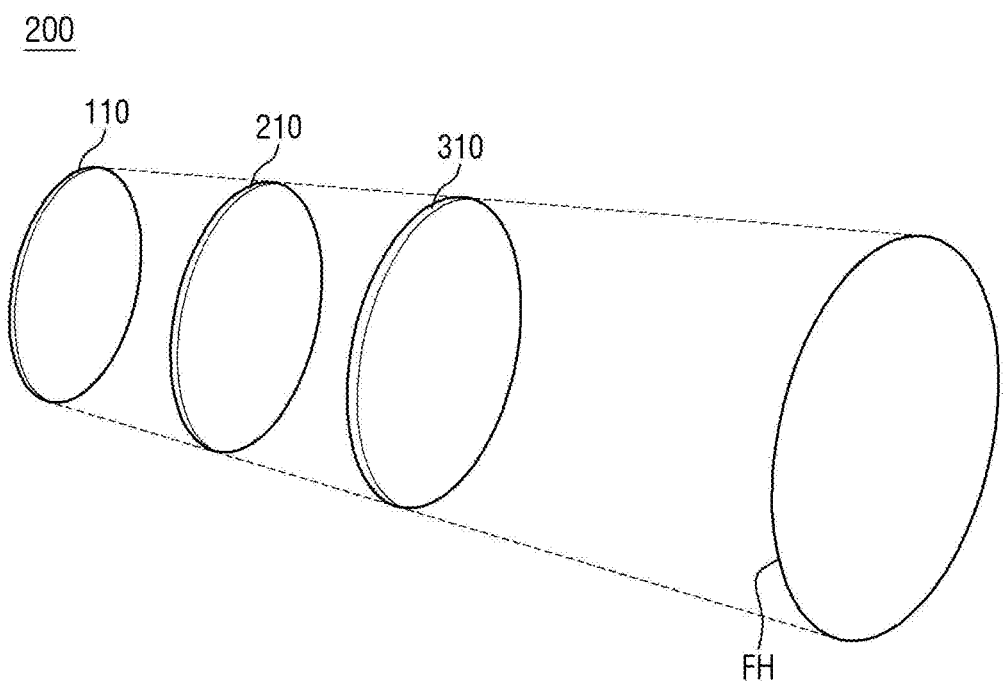
FIG. 4 is an exploded perspective view schematically illustrating the configuration of an extended reality content image display device according to a second embodiment.

FIG. 3 is an exploded perspective view schematically illustrating the configuration of an extended reality content image display device according to a first embodiment. FIG. 4 is an exploded perspective view schematically illustrating the configuration of an extended reality content image display device according to a second embodiment.

Referring to FIGS. 3 and 4, the display device 200 according to a first embodiment for displaying an extended reality content image such as a hologram may be shaped like a polygonal plane such as a square or rectangular plane or a quadrangular plate. On the other hand, the display device 200 according to a second embodiment may be shaped like a disk or a circular plate with a curved rim such as a circular or elliptical rim.

A display device 200 shaped like a quadrangular or circular plate may include at least one spatial light modulator 210, at least one surface light source device 110, and at least one image transmission member 310. Here, each of the spatial light modulator 210 and the surface light source device 110 may be shaped like a quadrangular or circular plate according to the planar structure or shape of the display device 200.

The at least one surface light source device 110 is disposed behind the spatial light modulator 210 to provide background light as a backlight to a rear surface of the spatial light modulator 210.

The surface light source device 110 may include an organic light emitting display device (OLED), an inorganic electroluminescent (EL) display device, a quantum dot light emitting display device (QED), a cathode ray tube (CRT) display device, a micro-light emitting diode (LED) display device, or a nano-LED display device.

A case where an organic light emitting display panel is applied as the surface light source device 110 will be described below as an example. However, the surface light source device 110 according to an embodiment is not limited to an organic light emitting display panel or device, and other display panels or devices listed above in the art can also be applied within the scope of the disclosure.

The surface light source device 110 applied as an organic light emitting display panel may be formed to have a different resolution from the at least one spatial light modulator 210. For example, the surface light source device 110 may be formed to have a lower resolution than the at least one spatial light modulator 210.

The surface light source device 110 receives extended reality content image data from the outside and arranges the extended reality content image data according to a preset first resolution. The extended reality content image data of the first resolution is converted into analog image signals and displayed on emission areas of an organic light emitting display surface.

The extended reality content image display light of the first resolution displayed on the organic light emitting display surface of the surface light source device 110, for example, on the emission areas of the surface light source device 110 is provided to the rear surface of the spatial light modulator 210 as a backlight, for example, background light.

The spatial light modulator 210 generates an extended reality content image according to the extended reality content image data from the outside and supplies the extended reality content image to the image transmission member 310 in front of the spatial light modulator 210, so that the extended reality content image is displayed in an image display direction and space of the image transmission member 310.

The spatial light modulator 210 may include a liquid crystal display device (LCD) that displays an extended reality content image of a second resolution on a front surface by using the background light of the first resolution provided from the surface light source device 110 located or disposed behind the spatial light modulator 210.

A case where a liquid crystal display panel is applied as the spatial light modulator 210 will be described below as an example. However, embodiments are not limited to a liquid crystal display panel or device, and other display devices listed above in the art can also be applied within the scope of the disclosure.

The spatial light modulator 210 applied as a liquid crystal display panel may be formed to have a higher resolution than the surface light source device 110.

The spatial light modulator 210 receives extended reality content image data input from the outside and arranges the extended reality content image data according to a preset second resolution. The extended reality content image data of the second resolution is converted into analog image signals and displayed on an image display surface on which a plurality of pixels are arranged or disposed. The second resolution of the spatial light modulator 210 is set to be higher than the first resolution of the surface light source device 110. Accordingly, the spatial light modulator 210 generates an extended reality content image of the second resolution higher than the first resolution by using the background light of the first resolution provided from the at least one surface light source device 110 behind the spatial light modulator 210 and displays the generated extended reality content image on its front surface.

The at least one image transmission member 310 transmits an extended reality content image FH of a third resolution, in which the background light of the first resolution and the extended reality content image of the second resolution are mixed, through a preset light path to direct and provide the extended reality content image FH in a preset image display direction. For example, the image transmission member 310 forms a display path (or light path) of the extended reality content image FH so that the extended reality content image FH of the third resolution can be displayed on a preset space or display surface.

The image transmission member 310 may include at least one optical member from among an optical waveguide (for example, a prism), a diffusion lens, and a focusing lens. Therefore, the extended reality content image FH displayed through the at least one spatial light modulator 210 is directed to a given space through the optical waveguide, the diffusion lens and at least one focusing lens and recognized as the extended reality content image FH of the third resolution in real space. The extended reality content image FH displayed as a hologram type by the image transmission member 310 may include 2D or 3D extended reality image content, which is a combination of graphic images, camera-photographed images and text images, and sound content.

Figure 5:
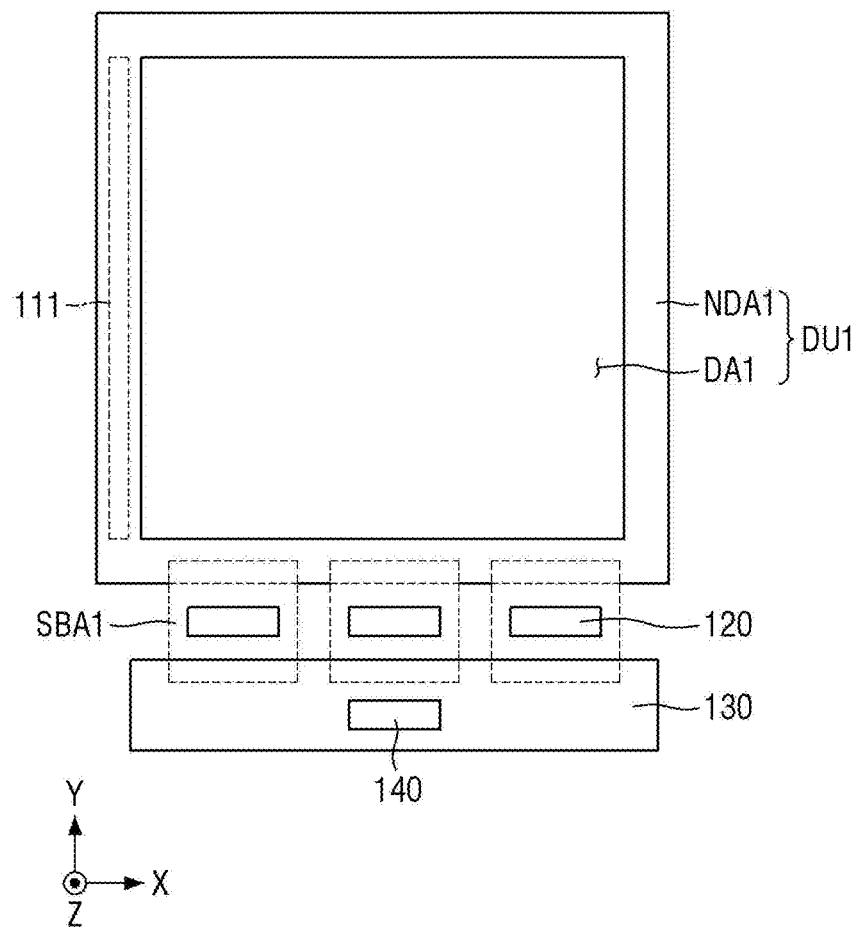
FIG. 5 is a schematic plan view of the first embodiment illustrating a surface light source device illustrated in FIG. 3.
Figure 6:
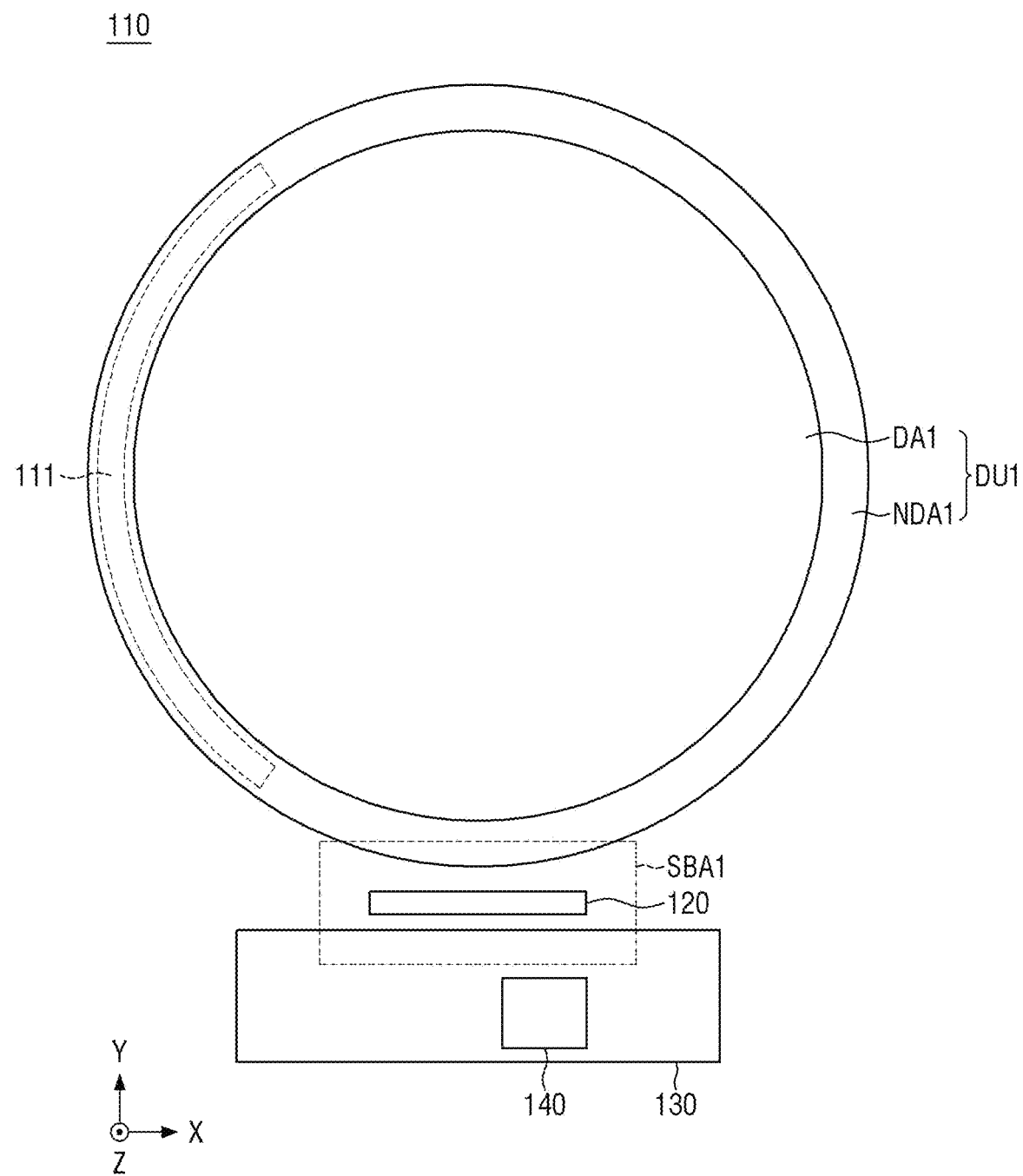
FIG. 6 is a schematic plan view of the first embodiment illustrating a surface light source device illustrated in FIG. 4.

FIG. 5 is a schematic plan view of the first embodiment illustrating a surface light source device illustrated in FIG. 3. FIG. 6 is a schematic plan view of the first embodiment illustrating a surface light source device illustrated in FIG. 4.

Referring to FIGS. 5 and 6, the at least one surface light source device 110 is formed to serve as a light source that provides background light to the rear surface of the at least one spatial light modulator 210.

The surface light source device 110 may have a substantially rectangular shape, a substantially square shape, a substantially circular shape, a substantially elliptical shape, or a substantially quadrate shape in plan view. For example, in case that the spatial light modulator 210 is formed in a substantially circular shape in plan view, the surface light source device 110 may also have a substantially circular shape corresponding to the substantially circular planar shape of the spatial light modulator 210. However, embodiments are not limited thereto, and the surface light source device 110 and the spatial light modulator 210 may also be formed in a substantially rectangular shape with long sides located or disposed in a horizontal direction and short sides located or disposed in a vertical direction.

Referring to FIG. 5, the at least one surface light source device 110 may include a surface light emitting unit DU1 which displays background light as a surface light source, an emission driving circuit 120 which drives light emitting pixels of the surface light emitting unit DU1, and a first data processor 140 which supplies extended reality content image data of a first resolution to the emission driving circuit 120.

For example, the at least one surface light source device 110 may include the surface light emitting unit DU1 which displays background light as a surface light source. Here, the surface light emitting unit DU1 may include a plurality of light emitting pixels and may emit background light, which is a surface light source, through the light emitting pixels. The light emitting pixels in the surface light emitting unit DU1 are formed and arranged or disposed to correspond to the preset first resolution.

The first data processor 140 extracts extended reality content image data of the first resolution from extended reality content image data input from the outside. By way of example, the first data processor 140 may convert the extended reality content image data input from the outside into the extended reality content image data of the preset first resolution. The first data processor 140 transmits the extended reality content image data of the first resolution to the emission driving circuit 120 of the surface light source device 110.

The emission driving circuit 120 may output data signal and voltages for driving the light emitting pixels of the surface light emitting unit DU1. For example, the emission driving circuit 120 receives extended reality content image data from the first data processor 140 such as a graphic card and arranges the extended reality content image data according to the preset first resolution. The extended reality content image data of the first resolution is converted into analog light emitting signals (or light emitting pixel voltages) and supplied to the light emitting pixels arranged or disposed on an organic light emitting display surface DA1 of the surface light emitting unit DU1.

The emission driving circuit 120 receives the average value of light emission grayscale for each block area in respect to preset block areas of the surface light emitting unit DU1 from a separate light emitting detection device. The emission driving circuit 120 generates and stores a light emission compensation value for each block area according to the deviation of the average value of light emission grayscale for each block area of the surface light emitting unit DU1.

The emission driving circuit 120 separates and divides the extended reality content image data sequentially input from the first data processor 140 into units of at least one frame, and aligns the extended reality content image data for each frame into preset block areas. The emission driving circuit 120 compensates the grayscale value of the extended reality content image data for each block area with the light emission compensation value for each block area. The emission driving circuit 120 may convert the extended reality content image data with compensated light emission compensation values for each block area into analog light emitting pixel voltage and supply the analog light emitting pixel voltage to the light emitting pixels arranged or disposed in the surface light emitting unit DU1.

Figure 7:
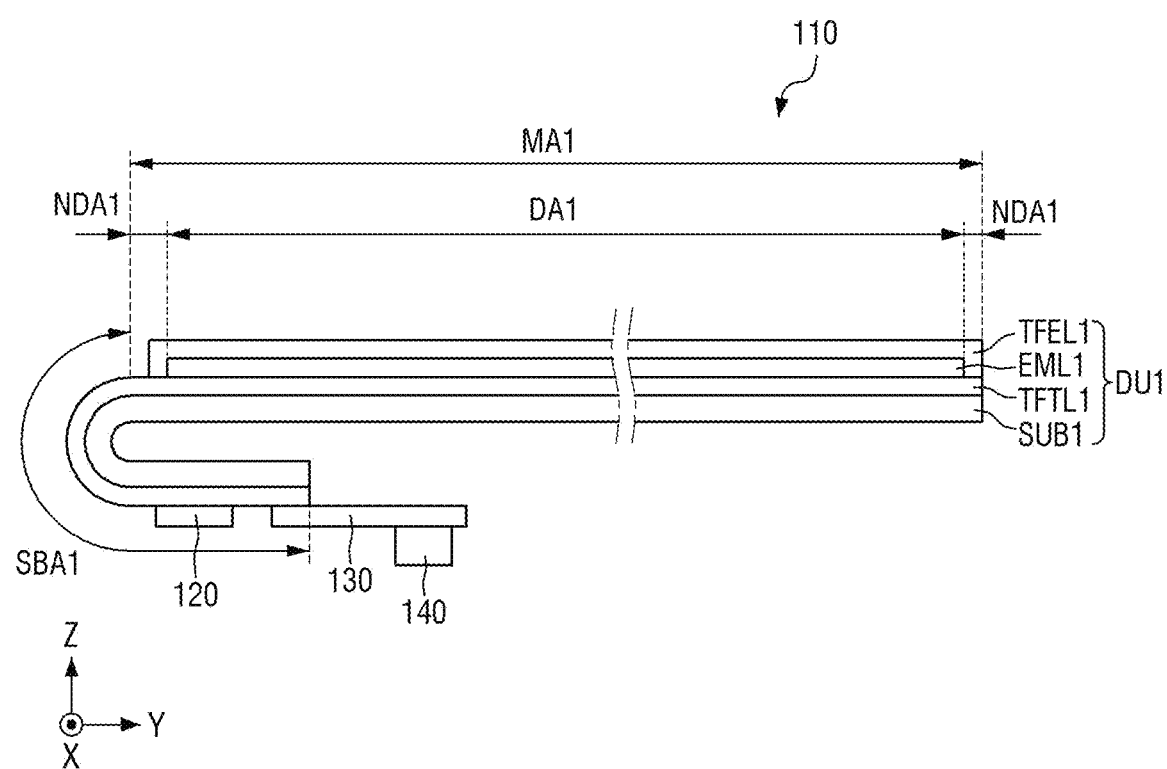
FIG. 7 is a side schematic cross-sectional view illustrating the cross-sectional structure of the surface light source device illustrated in FIGS. 4 and 5.

FIG. 7 is a side schematic cross-sectional view illustrating the cross-sectional structure of the surface light source device illustrated in FIGS. 4 and 5.

Referring to FIGS. 6 and 7, the surface light emitting unit DU1 may be divided into a first main area MA1 and a first sub-area SBA1. The first main area MA1 may include the organic light emitting display surface DA1 on which a plurality of light emitting pixels performing surface emission are arranged or disposed and a first non-display area NDA1 disposed around the organic light emitting display surface DA1.

Light emitted from respective emission areas or opening areas of the light emitting pixels may be displayed on the organic light emitting display surface DA1 as background light. To this end, the light emitting pixels of the organic light emitting display surface DA1 may include pixel drivers including switching elements, a pixel defining layer defining the emission areas or the opening areas, and self-light emitting elements.

The first non-display area NDA1 may be an area outside the organic light emitting display surface DA1. The first non-display area NDA1 may be defined as an edge area of the first main area MA1. The first non-display area NDA1 may further include a gate driver 111 supplying gate signals to gate lines and fan-out lines connecting the emission driving circuit 120 and the organic light emitting display surface DA1.

The first sub-area SBA1 may extend from a side of the first main area MA1. The first sub-area SBA1 may include a flexible material that can be bent, folded, or rolled. For example, in case that the first sub-area SBA1 is bent, it may be overlapped by the first main area MA1 in a thickness direction (Z-axis direction). The first sub-area SBA1 may include the emission driving circuit 120 and a pad unit connected to a first circuit board 130. Optionally, the first sub-area SBA1 may be omitted, and the emission driving circuit 120 and the pad unit may be disposed in the first non-display area NDA1.

At least one emission driving circuit 120 may be formed as an integrated circuit and mounted in the first non-display area NDA1 by a chip on glass (COG) method, a chip on plastic (COP) method, or an ultrasonic bonding method. For example, the emission driving circuit 120 may be disposed in the first sub-area SBA1 and may be overlapped by the first main area MA1 in the thickness direction (Z-axis direction) by the bending of the first sub-area SBA1. For another example, the emission driving circuit 120 may be mounted on the first circuit board 130.

The first circuit board 130 may be attached onto the pad unit of the first non-display area NDA using an anisotropic conductive film (ACF). Lead lines of the first circuit board 130 may be electrically connected to the pad unit of the first non-display area NDA1. The first circuit board 130 may be a flexible printed circuit board, a printed circuit board, or a flexible film such as a chip on film.

A first substrate SUB1 of the surface light emitting unit DU1 illustrated in FIG. 7 may be a base substrate or a base member. The first substrate SUB1 may be a flexible substrate that can be bent, folded, or rolled. For example, the first substrate SUB1 may include a glass material or a metal material. However, embodiments are not limited thereto. For another example, the first substrate SUB1 may include polymer resin such as polyimide (PI).

A first thin-film transistor layer TFTL1 may be disposed on the first substrate SUB1. The first thin-film transistor layer TFTL1 may include a plurality of thin-film transistors constituting pixel drivers of light emitting pixels. The first thin-film transistor layer TFTL1 may further include gate lines, data lines, power lines, gate control lines, fan-out lines connecting the emission driving circuit 120 and the data lines, and lead lines connecting the emission driving circuit 120 and the pad unit. In case that the first gate driver 111 is formed on a side of the first non-display area NDA1 of the surface light emitting unit DU1, it may also include thin-film transistors.

The first thin-film transistor layer TFTL1 may be disposed on the organic light emitting display surface DA1, the first non-display area NDA1, and the first sub-area SBA1. The thin-film transistors of the pixels, the gate lines, the data lines, and the power lines of the first thin-film transistor layer TFTL1 may be disposed on the organic light emitting display surface DA1. The gate control lines and the fan-out lines of the first thin-film transistor layer TFTL1 may be disposed in the first non-display area NDA1. The lead lines of the first thin-film transistor layer TFTL1 may be disposed in the first sub-area SBA.

A first light emitting element layer EML1 may be disposed on the first thin-film transistor layer TFTL1. The first light emitting element layer EML1 may include a plurality of light emitting elements, each including a first electrode, a light emitting layer and a second electrode sequentially stacked to emit light, and a pixel defining layer defining the pixels. The light emitting elements of the first light emitting element layer EML1 may be disposed on the organic light emitting display surface DA1.

A first encapsulation layer TFEL1 may cover upper and side surfaces of the first light emitting element layer EML1 and may protect the first light emitting element layer EML1. The first encapsulation layer TFEL1 may include at least one inorganic layer and at least one organic layer to encapsulate the first light emitting element layer EML1.

Figure 8:
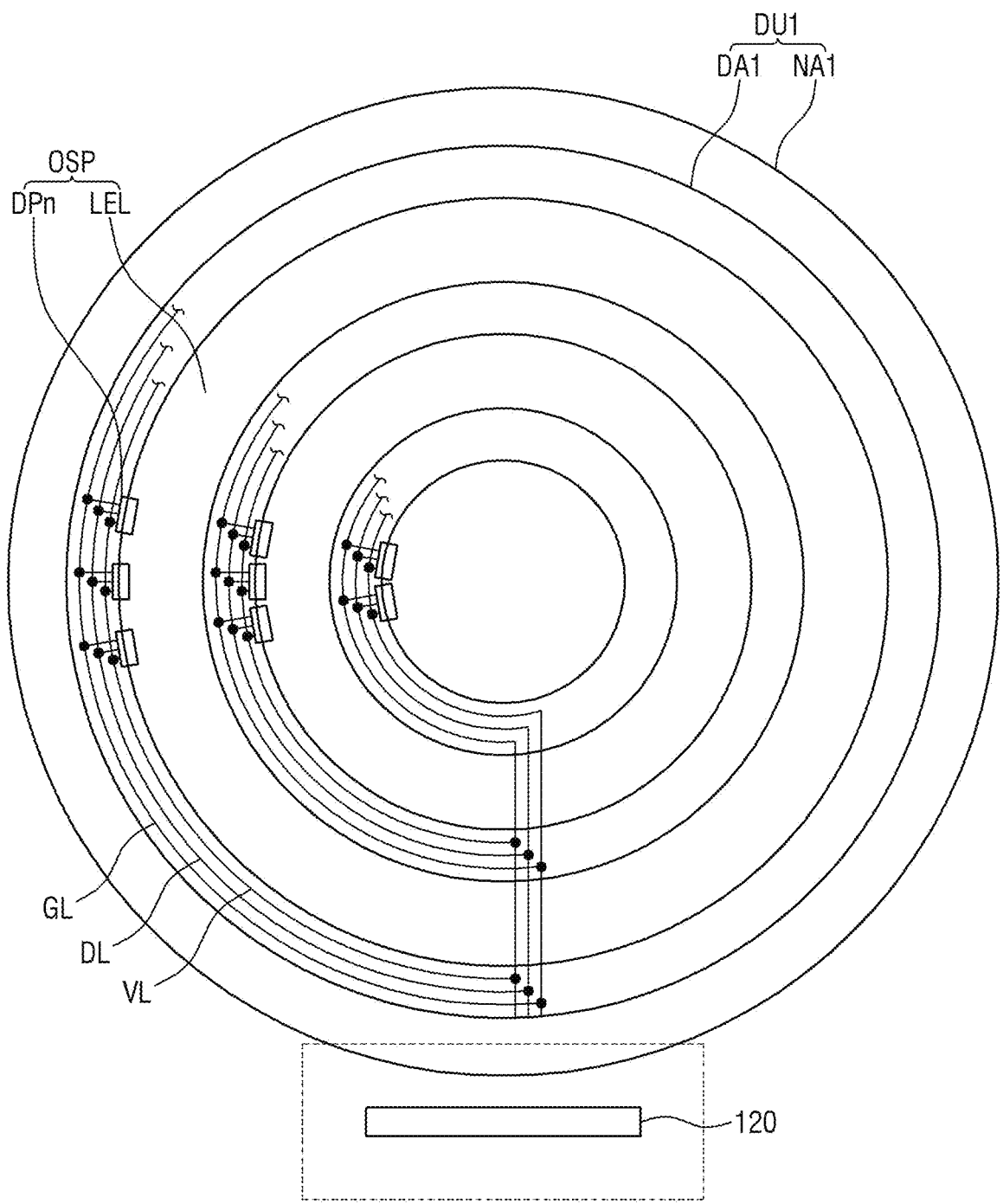
FIG. 8 is a plan view of the first embodiment schematically illustrating the structure of an organic light emitting display surface of the surface light source device illustrated in FIGS. 4 and 5.

FIG. 8 is a plan view of the first embodiment schematically illustrating the structure of an organic light emitting display surface of the surface light source device illustrated in FIGS. 4 and 5.

Referring to FIG. 8, the organic light emitting display surface DA1 of the surface light emitting unit DU1 is an area that displays background light through surface light emission and may be defined as a central area of the surface light emitting unit DU1. The organic light emitting display surface DA1 may include a plurality of light emitting pixels OSP, a plurality of gate lines GL, data lines DL, and power lines VL. Each of the light emitting pixels OSP may be defined as a minimum unit that emits light.

Each of the light emitting pixels OSP arranged or disposed on the organic light emitting display surface DA1 may include a plurality of pixel drivers DPn and a light emitting element LEL.

The light emitting element LEL is connected in parallel to the pixel drivers DPn and emits light in response to driving currents simultaneously input from the pixel drivers DPn.

The light emitting pixels OSP are disposed at ultra-low resolution. For example, the light emitting pixels OSP may be formed and disposed on the organic light emitting display surface DA1 in units of at least three. In other words, the light emitting pixels OSP may be formed and disposed on the organic light emitting display surface DA1 in units of at least three, and the number of light emitting pixels OSP disposed on the organic light emitting display surface DA1 may be a multiple of 3 (3, 6, 9, 12, 15, . . . ).

The organic light emitting display surface DA1 may be formed in a circular shape in plan view according to the planar shape of the surface light source device 110. Like in FIG. 8, the light emitting elements LEL may be disposed in a circular shape in plan view by surrounding a center (or center point) of the organic light emitting display surface DA1 in a circular shape. For example, at least three light emitting pixels OSP may each be formed in a concentric circle structure.

On the organic light emitting display surface DA1 formed in a circular shape in plan view, the light emitting elements LEL may be formed in at least any one of a sector shape, a triangular shape, a rhombus shape, a circular shape, a semicircular shape and an elliptical shape in plan view or may be formed in a combination of a plurality of shapes. However, the planar areas of the light emitting elements LEL for each light emitting pixel OSP may all be formed to be the same.

The planar area of the light emitting element LEL of each light emitting pixel OSP is inversely proportional to the number of resolutions. For example, the planar area of each light emitting element LEL may be inversely proportional to the resolution at which the light emitting elements LEL are disposed. Since a resistance-capacitance (RC) value of each light emitting element LEL increases as the planar area of each light emitting element LEL increases, a plurality of pixel drivers DPI through DPn are connected to each light emitting element LEL to prevent a reduction in the amount of light emitted from each light emitting element LEL. Accordingly, the pixel drivers DPI through DPn of each light emitting pixel OSP receive control signals and a light emitting pixel voltage at the same timing and drive the light emitting element LEL at the same driving timing.

A plurality of pixel drivers DPn are connected to each light emitting element LEL. The pixel drivers DPn may be formed and disposed along at least any one side surface of a light emitting element LEL to partially overlap the light emitting element LEL.

The pixel drivers DPn receive the same control signals and light emitting pixel voltage through the emission driving circuit 120 and the first gate driver 111 and drive the light emitting element LEL connected in parallel thereto at the same driving timing in units of at least one frame.

The plurality of gate lines GL may include at least one of a display initialization line, a display scan line, and a display control line.

The plurality of gate lines GL may supply the plurality of scan control signals received from the first gate driver 111 to the plurality of light emitting pixels OSP. Each of the gate lines (scan lines) may extend in X-axis and Y-axis directions according to the arrangement direction and planar shape of the light emitting pixels OSP and may be disposed in the X-axis or Y-axis direction around the light emitting pixels OSP.

The plurality of data lines DL may supply light emitting control voltages received from the emission driving circuit 120 to the plurality of light emitting pixels OSP. The data lines DL may extend in the X-axis and Y-axis directions according to the arrangement direction and planar shape of the light emitting pixels OSP and may be disposed in the X-axis or Y-axis direction around the light emitting pixels OSP.

The plurality of power lines VL may supply each power supply voltage received from the emission driving circuit 120 or a separate power supplier to the light emitting pixels OSP. Here, the power supply voltages may be at least one of a high-potential driving voltage, a low-potential ground voltage, and a reference voltage. The power lines VL may extend in the X-axis and Y-axis directions according to the arrangement direction and planar shape of the light emitting pixels OSP and may be disposed in the X-axis or Y-axis direction around the light emitting pixels OSP.

The first non-display area NDA1 may include the first gate driver 111, fan-out lines, and gate control lines. The first gate driver 111 may generate gate signals based on a gate control signal in units of at least one frame period and may simultaneously supply the gate signals to the plurality of gate lines (scan lines) in units of at least one frame period.

The fan-out lines may extend from the emission driving circuit 120 to the organic light emitting display surface DA1. The fan-out lines may simultaneously supply light emitting control voltages received from the emission driving circuit 120 to the data lines DL in units of at least one frame period.

The first gate control lines may extend from the emission driving circuit 120 to the first gate driver 111. The first gate control lines may supply gate control signals received from the emission driving circuit 120 to the first gate driver 111.

The emission driving circuit 120 supplies gate control signals to the first gate driver 111 through the gate control lines. Accordingly, the first gate driver 111 supplies a plurality of scan control signals for simultaneously driving the light emitting pixels OSP to the light emitting pixels OSP. Here, the emission driving circuit 120 may output analog light emitting pixel voltages for simultaneously driving the light emitting pixels OSP to the fan-out lines. The light emitting pixel voltages may be supplied to the plurality of light emitting pixels OSP and may determine luminances of the plurality of light emitting pixels OSP.

Figure 9:
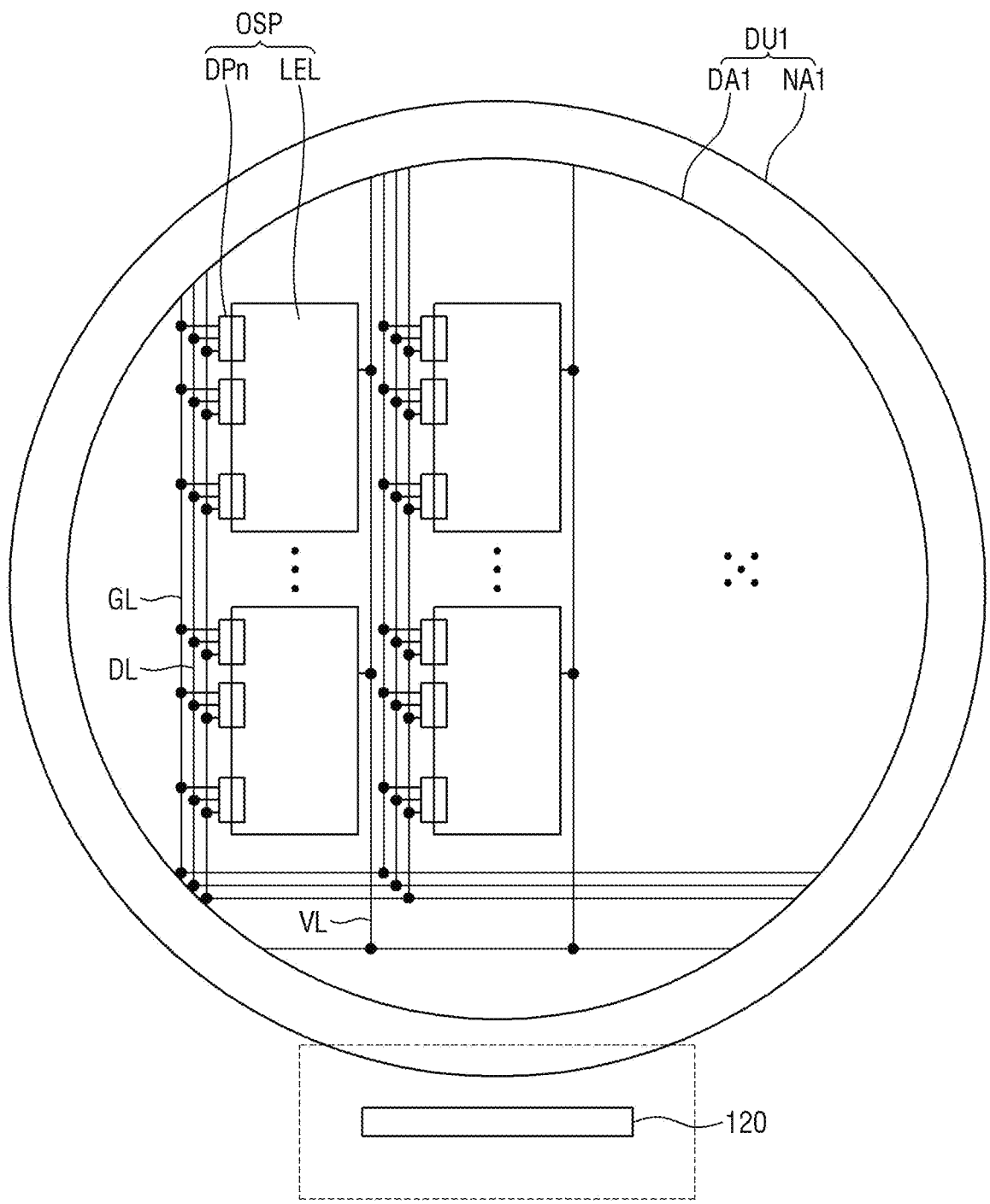
FIG. 9 is a plan view of the second embodiment schematically illustrating the structure of an organic light emitting display surface of the surface light source device illustrated in FIGS. 4 and 5.

FIG. 9 is a plan view of the second embodiment schematically illustrating the structure of an organic light emitting display surface of the surface light source device illustrated in FIGS. 4 and 5.

Referring to FIG. 9, the organic light emitting display surface DA1 of the surface light emitting unit DU1 is an area that displays background light through surface light emission and may be defined as a central area of the surface light emitting unit DU1. The organic light emitting display surface DA1 may include a plurality of light emitting pixels OSP, a plurality of gate lines GL, data lines DL, and power lines VL. Each of the light emitting pixels OSP may be defined as a minimum unit that emits light. The plurality of gate lines GL may include at least one of a display initialization line, a display scan line, and a display control line.

Each light emitting pixel OSP arranged or disposed on the organic light emitting display surface DA1 may be arranged or disposed in a matrix form in vertical and horizontal stripes. For example, the light emitting elements LEL may be arranged or disposed in a matrix form in vertical and horizontal stripes. The light emitting elements LEL may be formed in a rectangular or square shape in plan view.

The plurality of gate lines GL may supply a plurality of scan control signals received from the first gate driver 111 to the plurality of light emitting pixels OSP. Each of the gate lines (scan lines) may extend in X-axis and Y-axis directions according to the arrangement direction and planar shape of the light emitting pixels OSP and may be disposed in the X-axis or Y-axis direction around the light emitting pixels OSP.

The plurality of data lines DL may supply light emitting control voltages received from the emission driving circuit 120 to the light emitting pixels OSP. The data lines DL may extend in the X-axis and Y-axis directions according to the arrangement direction and planar shape of the light emitting pixels OSP and may be disposed in the X-axis or Y-axis direction around the light emitting pixels OSP.

The power lines VL may supply each power supply voltage received from the emission driving circuit 120 or a separate power supplier to the light emitting pixels OSP. Here, the power supply voltages may be at least one of a high-potential driving voltage, a low-potential ground voltage, and a reference voltage. The power lines VL may extend in the X-axis and Y-axis directions according to the arrangement direction and planar shape of the light emitting pixels OSP and may be disposed in the X-axis or Y-axis direction around the light emitting pixels OSP.

Figure 10:
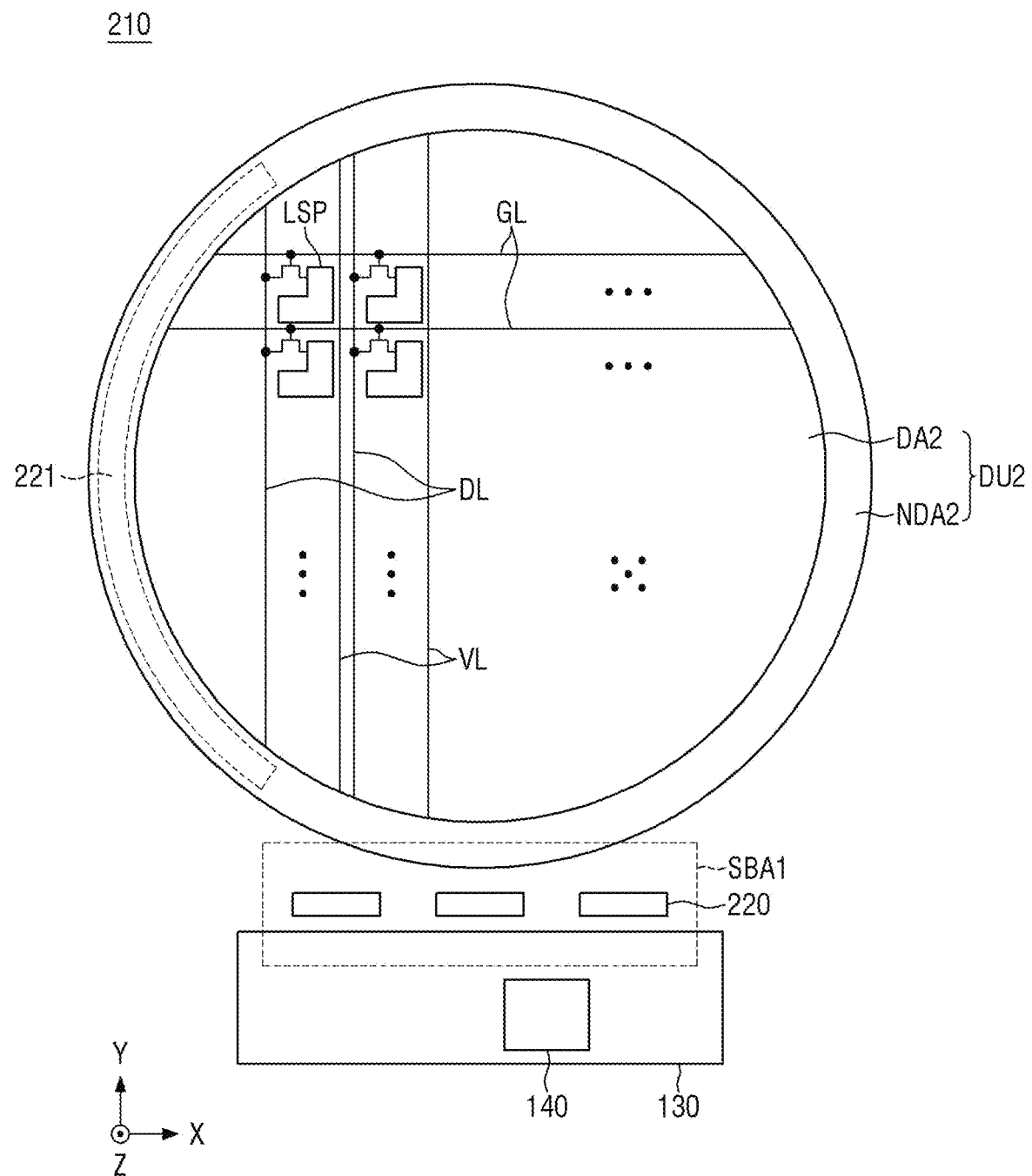
FIG. 10 is a plan view schematically illustrating the schematically illustrating the structure of an image display unit of a spatial light modulator illustrated in FIG. 3.

FIG. 10 is a plan view schematically illustrating the schematically illustrating the structure of an image display unit of a spatial light modulator illustrated in FIG. 3.

Referring to FIG. 10, the spatial light modulator 210 may include a liquid crystal image display unit DU2 and a second data processor 240.

The liquid crystal image display unit DU2 displays an extended reality content image on a front surface by using background light provided from the surface light source device 110 located or disposed behind the spatial light modulator 210. The liquid crystal image display unit DU2 may include a plurality of liquid crystal pixels LSP and displays an extended reality content image through the liquid crystal pixels LSP.

The image display surface DA2 of the liquid crystal image display unit DU2 is an image display area that displays an extended reality content image and may be defined as a central area of the liquid crystal image display unit DU2. The image display surface DA2 may include a plurality of liquid crystal pixels LSP, a plurality of gate lines GL, a plurality of data lines DL, and a plurality of power lines VL. Each of the liquid crystal pixels LSP may be defined as a minimum unit that displays an extended reality content image by passing background light through the liquid crystal pixels LSP. A plurality of liquid crystal pixels LSP are formed and arranged or disposed to correspond to a preset second resolution.

Each liquid crystal pixel LSP may include a plurality of data lines DL, a plurality of gate lines GL intersecting the plurality of data lines DL, thin-film transistors formed in each intersection area of the plurality of data lines DL and the plurality of gate lines GL, a pixel electrode connected to each thin-film transistor, a liquid crystal cell formed in an area between the pixel electrode and the common electrode, and a storage capacitor formed in a parallel structure to the liquid crystal cell. Liquid crystal cells are driven by a difference voltage between the data voltage of the pixel electrode and the common voltage of the common electrode and an electric field according to the difference voltage. Liquid crystal cells implement image display light by diffracting and passing background light by the difference voltage between the data voltage and the common voltage and the electric field according to the difference voltage. A color filter is placed on each liquid crystal pixel LSP to display a color image.

A data processor 140 supplies extended reality content image data to a display driving circuit 220, which drives the liquid crystal pixels of the liquid crystal image display unit DU2.

The data processor 140 extracts extended reality content image data of a second resolution from extended reality content image data input from the outside, or converts the extended reality content image data input from the outside to a preset extended reality content image data of a second resolution. The extended reality content image data of the second resolution is transmitted to the display driving circuit 220 of the spatial light modulator 210.

The display driving circuit 220 of the spatial light modulator 210 may output data signals and voltages for driving liquid crystal pixels of the liquid crystal image display unit DU2. For example, the display driving circuit 220 receives the extended reality content image data input from a second data processor, such as a graphic card, and aligns the extended reality content image data according to a preset second resolution. The extended reality content image data of the second resolution is converted into an analog image signal and supplied to the liquid crystal pixels arranged or disposed on the image display surface DA2 of the liquid crystal display unit DU2.

The display driving circuit 220 receives the grayscale average value of the display image for each block area for preset block areas of the liquid crystal image display unit DU2 from a separate light emitting detection device. The display driving circuit 220 generates and stores an image grayscale compensation value for each block area according to the deviation of the grayscale average value for each block area of the liquid crystal image display unit DU2.

The display driving circuit 220 separates and divides the extended reality content image data sequentially input from the data processor 140 into units of at least one frame, and aligns the extended reality content image data for each frame into preset block areas.

The display driving circuit 220 compensates the grayscale value of the extended reality content image data for each block area with the image grayscale compensation value for each block area. The display driving circuit 220 converts the extended reality content image data in in which the image grayscale compensation values for each block area are compensated into an analog image signal, and supply liquid crystal pixels LSP arranged or disposed on the image display surface DA2.

Figure 11:
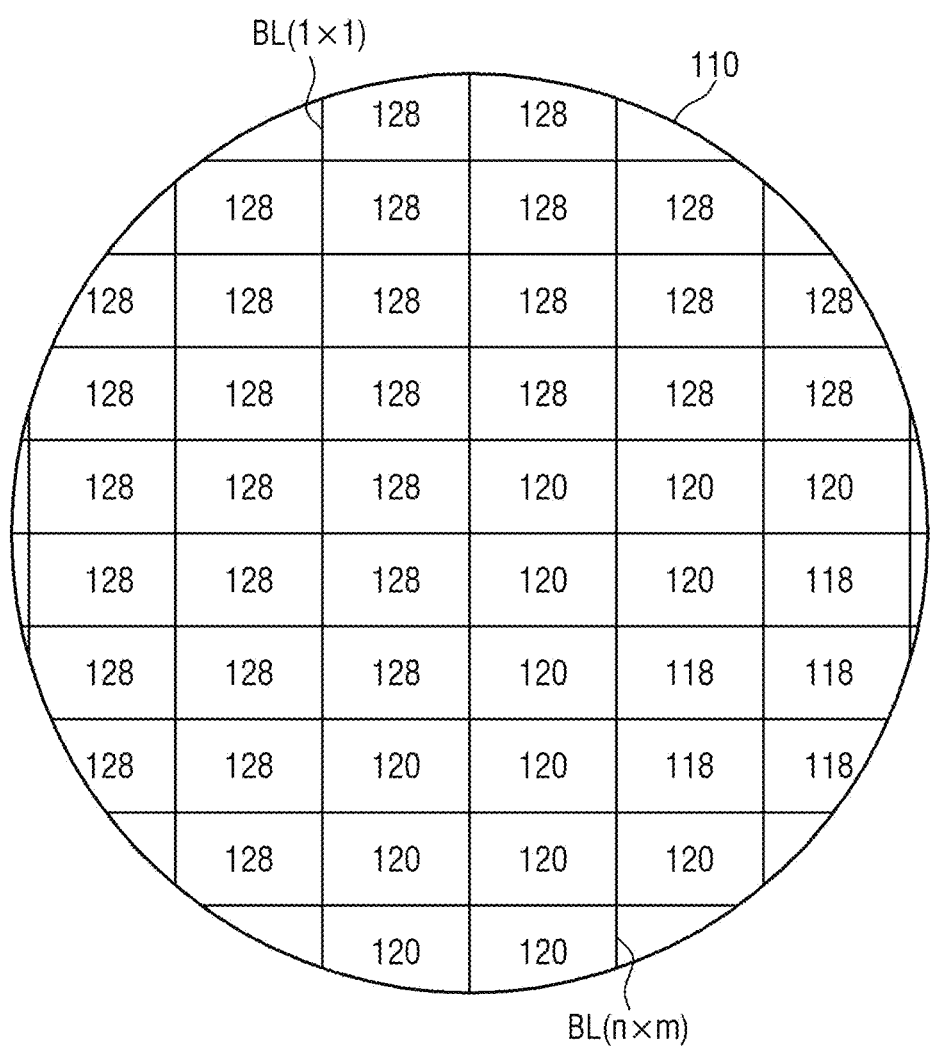
FIG. 11 is a diagram illustrating detection results of the average light emission grayscale value for each block area of the organic light emitting display surface illustrated in FIGS. 8 and 9.

FIG. 11 is a diagram illustrating detection results of the average light emission grayscale value for each block area of the organic light emitting display surface illustrated in FIGS. 8 and 9.

Referring to FIG. 11, the emission driving circuit 120 outputs a light emission data signal and light emitting pixel voltage for driving the light emitting pixels OSP of the surface light emitting unit DU1 to emit light of the light emitting pixels OSP of the surface light emitting unit DU1.

At this time, a separate light emitting detection device is disposed in a direction facing the surface light emitting unit DU1 of the surface light source device 110 and detects light emitted from the surface light emitting unit DU1. The light emitting detection device detects light emitted from the surface light emitting unit DU1 using light receiving elements such as a plurality of image sensors arranged or disposed in an N×M number. Here, N and M are positive integers of 3 or 30 or more that are the same or different from each other. For example, the light emitting detection device divides the surface light emitting unit DU1 of the surface light source device 110 into block areas BL1 (1×1) to BL (n×m) of a preset size and number, and the average value of light emission grayscale (or brightness value) is detected for each of the block areas BL1 (1×1) to BL (n×m). Here, N and M are positive integers of 3 or more that are the same or different from each other. The average value of light emission grayscale may be the grayscale average value detected by a plurality of light receiving elements in respect to each of the block areas BL1 (1×1) to BL (n×m).

For example, the emission driving circuit 120 may generate light emitting pixel voltages according to image data of 128 grayscales among image data of 0 grayscale to 256 grayscales, and output them to the light emitting pixels OSP so that the light emitting pixels of the surface light emitting unit DU1 can emit light with a brightness corresponding to 128 grayscales.

The light emitting detection device divides the entire light emitting surface of the surface light emitting unit DU1 into a plurality of preset block areas BL1 (1×1) to BL (n×m), and detect the average value of light emission grayscale (or brightness value) for each of the block areas BL1 (1×1) to BL (n×m).

As illustrated in FIG. 11, the average value of light emission grayscale for each of the block areas BL1 (1×1) to BL (n×m) detected by the light emitting detection device may be detected as 128 grayscales, but may also be detected as 120 grayscales, 118 grayscales or the like depending on the RC resistance deviation for each of the block areas BL1 (1×1) to BL (n×m). In this case, block areas where grayscale deviations appear may be recognized as spots through the liquid crystal image display unit DU2 that uses light of the surface light emitting unit DU1 as the rear surface light. To solve this spot recognition problem, the grayscale deviation for each of the block areas BL1 (1×1) to BL (n×m) is compensated.

Figure 12:
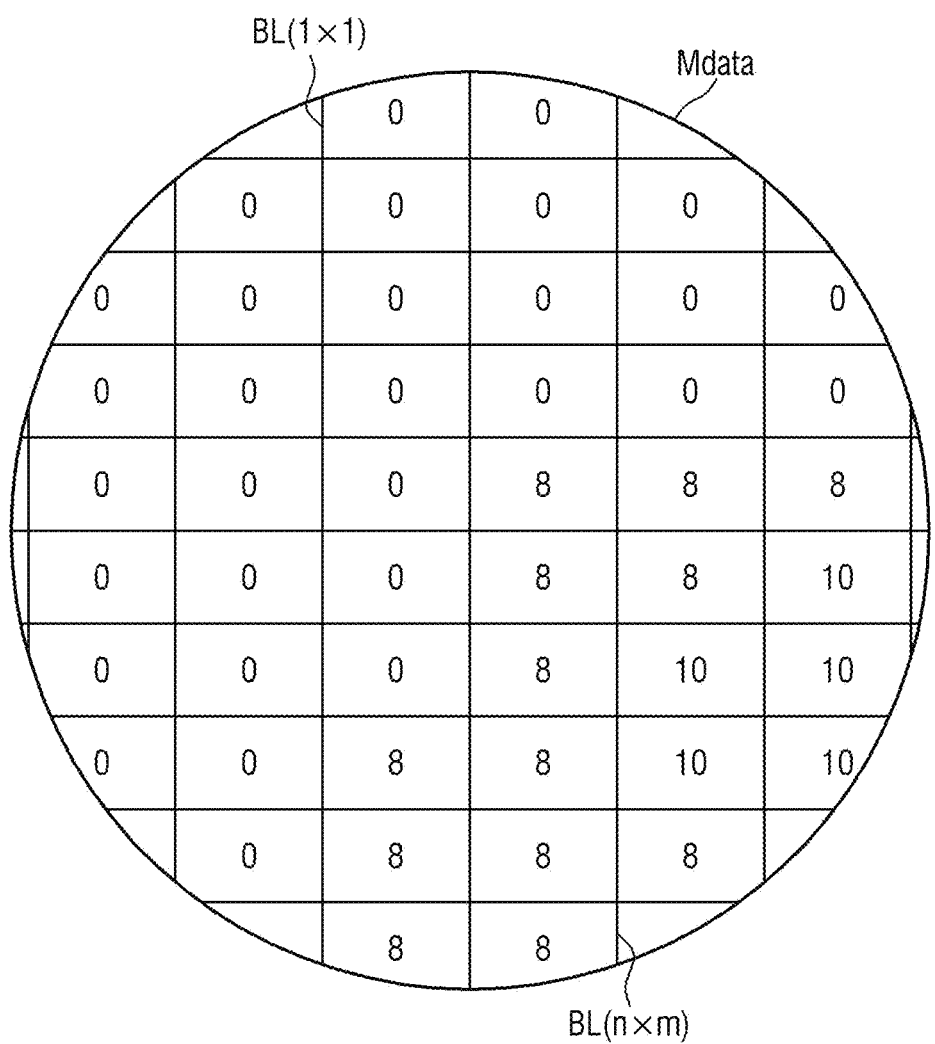
FIG. 12 is a diagram illustrating setting results of the compensation grayscale values for each block area of the organic light emitting display surface.

FIG. 12 is a diagram illustrating setting results of the compensation grayscale values for each block area of the organic light emitting display surface.

Referring to FIG. 12, the emission driving circuit 120 receives the average value of light emission grayscale (or brightness value) for each of the block areas BL1 (1×1) to BL (n×m) detected by the light emitting detection device. The emission driving circuit 120 generates and stores the light emission compensation value Mdata for each of the block areas BL1 (1×1) to BL (n×m) to respectively correspond to the average value of light emission grayscale deviation of for each of the block areas BL1 (1×1) to BL (n×m) of the surface light emitting unit DU1. Here, the light emission compensation value Mdata for each of the block areas BL1 (1×1) to BL (n×m) may be set as the difference value between the 128 grayscales which is the light emission grayscale value of the light emitting pixels OSP and the average value of light emission grayscale for each of the block areas BL1 (1×1) to BL (n×m).

Figure 13:
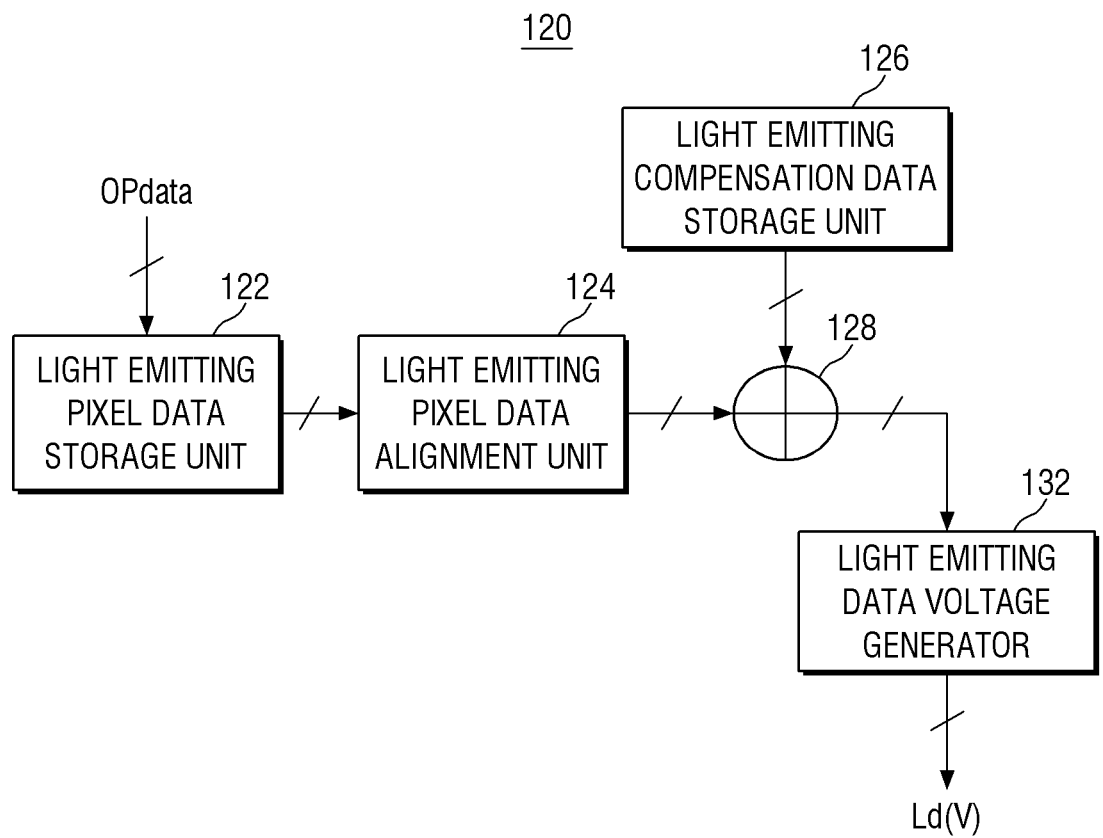
FIG. 13 is a configuration block diagram illustrating a detailed structure of an emission driving circuit illustrated in FIGS. 8 and 9.

FIG. 13 is a configuration block diagram illustrating a detailed structure of an emission driving circuit illustrated in FIGS. 8 and 9.

Referring to FIG. 13, the emission driving circuit 120 may include a light emitting pixel data storage unit 122, a light emitting pixel data alignment unit 124, a light emitting compensation data storage unit 126, a first data compensation unit 128, and a light emitting data voltage generator 132.

The light emitting pixel data storage unit 122 stores the extended reality content image data OPdata input from the first data processor 140 in units of at least one frame. For example, the light emitting pixel data storage unit 122 may store the extended reality content image data OPdata which is sequentially input from the first data processor 140 in units of at least one line or light emitting pixel OSP in units of at least one frame.

The light emitting pixel data alignment unit 124 aligns the extended reality content image data stored in the light emitting pixel data storage unit 122 for at least one light emitting pixel OSP of horizontal line unit of the surface light emitting unit DU1 or each of the light emitting pixels OSP and output the extended reality content image data to the first data compensation unit 128.

The light emitting compensation data storage unit 126 receives the average value of light emission grayscale (or brightness value) for each of the preset block areas BL1 (1×1) to BL (n×m) detected by the light emitting detection device. The light emission compensation value Mdata for each of the block areas BL1 (1×1) to BL (n×m) is generated and stored to respectively correspond to the deviation of the average value of light emission grayscale for each of the block areas BL1 (1×1) to BL (n×m). As described above, the light emitting compensation data storage unit 126 may generate and store the light emission compensation value Mdata for each of the block areas BL1 (1×1) to BL (n×m) to respectively correspond to the deviation of the average value of light emission grayscale for each of the block areas BL1 (1×1) to BL (n×m).

The first data compensation unit 128 sequentially calculates the light emission compensation value Mdata for each of the block areas BL1 (1×1) to BL (n×m) on the image data for each light emitting pixel OSP in a preset calculation method to generate a compensation image data for each light emitting pixel OSP. The first data compensation unit 128 calculates by adding or multiplying the light emission compensation values for each of the block areas BL1 (1×1) to BL (n×m) of the light emitting compensation data storage unit 126 to the image data for each light emitting pixel OSP sequentially input from the light emitting pixel data alignment unit 124 and generate compensation image data for each light emitting pixel OSP.

The light emitting data voltage generator 132 converts compensation image data for each of the light emitting pixels OSP with compensated light emission compensation values into an analog light emitting pixel voltage and supplies it to the light emitting pixels OSP. The light emitting data voltage generator 132 converts the compensation image data into the light emitting pixel voltage Ld(V) in horizontal line units of the surface light emitting unit DU1 and simultaneously supply the light emitting pixel voltage Ld(V) to the light emitting pixels OSP in horizontal line units.

Figure 14:
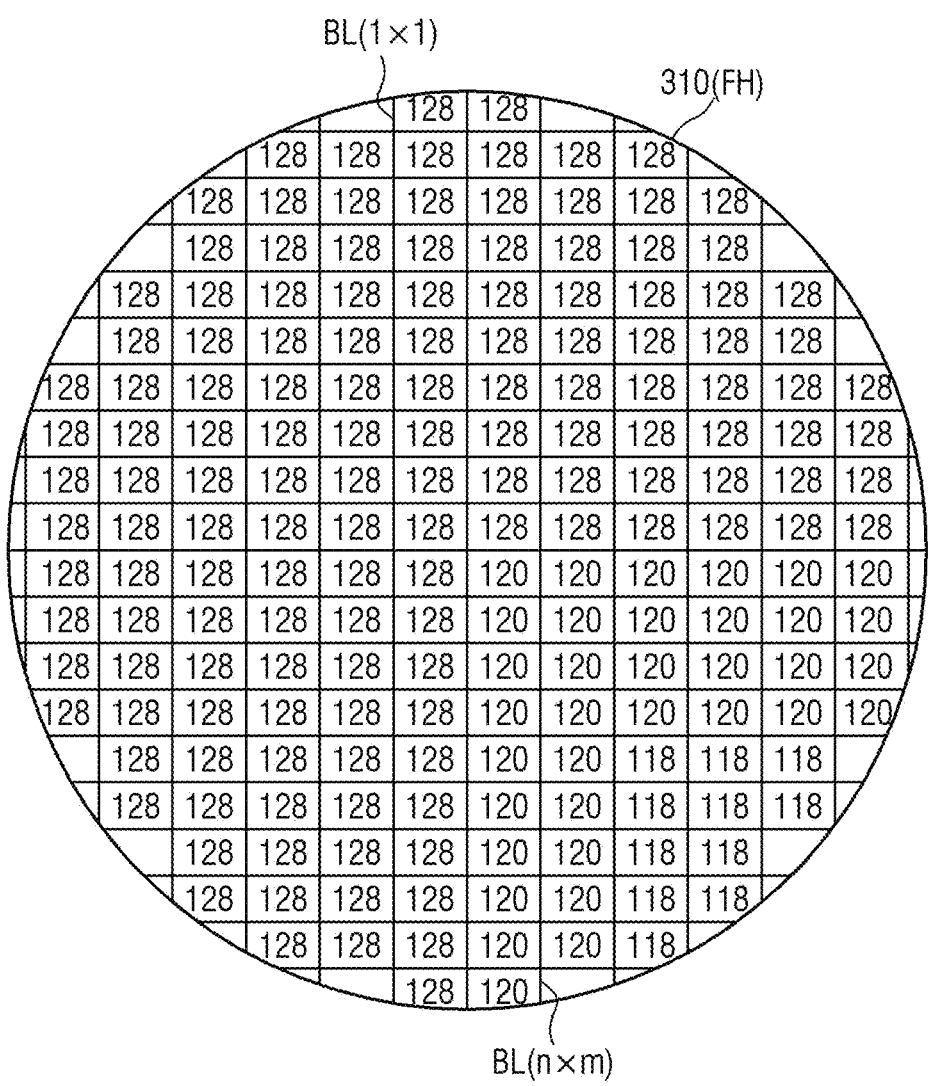
FIG. 14 is a diagram illustrating detection results of the average light emission grayscale value for each block area of a liquid crystal image display unit illustrated in FIG. 10.

FIG. 14 is a diagram illustrating detection results of the average light emission grayscale value for each block area of a liquid crystal image display unit illustrated in FIG. 10.

Referring to FIG. 14, the display driving circuit 220 may output image data signals, for example, analog image signals, for driving the liquid crystal pixels LSP of the liquid crystal image display unit DU2 to the liquid crystal pixels LSP, thereby displaying an image due to liquid crystal pixels LSP arranged or disposed on the image display surface DA2.

A separate light emitting detection device is disposed in a direction facing the liquid crystal image display unit DU2 of the spatial light modulator 210 and detects image display light displayed through the liquid crystal image display unit DU2. As described above, the light emitting detection device detects image display light displayed on the front surface through the image display surface DA2 using light receiving elements such as a plurality of image sensors arranged or disposed in N×M numbers. Here, N and M are positive integers of 3 or 30 or more that are the same or different from each other. For example, the light emitting detection device divides the liquid crystal image display unit DU2 of the spatial light modulator 210 into block areas BL1 (1×1) to BL (n×m) of a preset size and number, and the average value of image display grayscale (or brightness value) is detected for each of the block areas BL1 (1×1) to BL (n×m). Here, N and M are positive integers of 3 or more that are the same or different from each other. The average value of image display grayscale may be the grayscale average value of image display light detected by a plurality of light receiving elements in respect to each of the block areas BL1 (1×1) to BL (n×m).

For example, the display driving circuit 220 may generate analog image signals according to image data of 128 grayscales among image data of 0 grayscale to 256 grayscales, and output them to the liquid crystal pixels LSP so that the image display light corresponding to 128 grayscales can be emitted through liquid crystal pixels LSP of the liquid crystal image display unit DU2.

The light emitting detection device divides the entire image display surface of the liquid crystal image display unit DU2 into a plurality of preset block areas BL1 (1×1) to BL (n×m), and detect the average value of image display grayscale (or brightness value) for each of the block areas (BL1 (1×1)) to BL (n×m)).

As illustrated in FIG. 14, the average value of image display grayscale for each of the block areas BL1 (1×1) to BL (n×m) detected by the light emitting detection device may be detected as 128 grayscales, but may also be detected as 120 grayscales, 118 grayscales or the like depending on the RC resistance deviation for each of the block areas BL1 (1×1) to BL (n×m). In this case, block areas where grayscale deviations appear may be recognized as spots through the display image display. To solve this spot recognition problem, the grayscale deviation for each of the block areas BL1 (1×1) to BL (n×m) is compensated.

Figure 15:
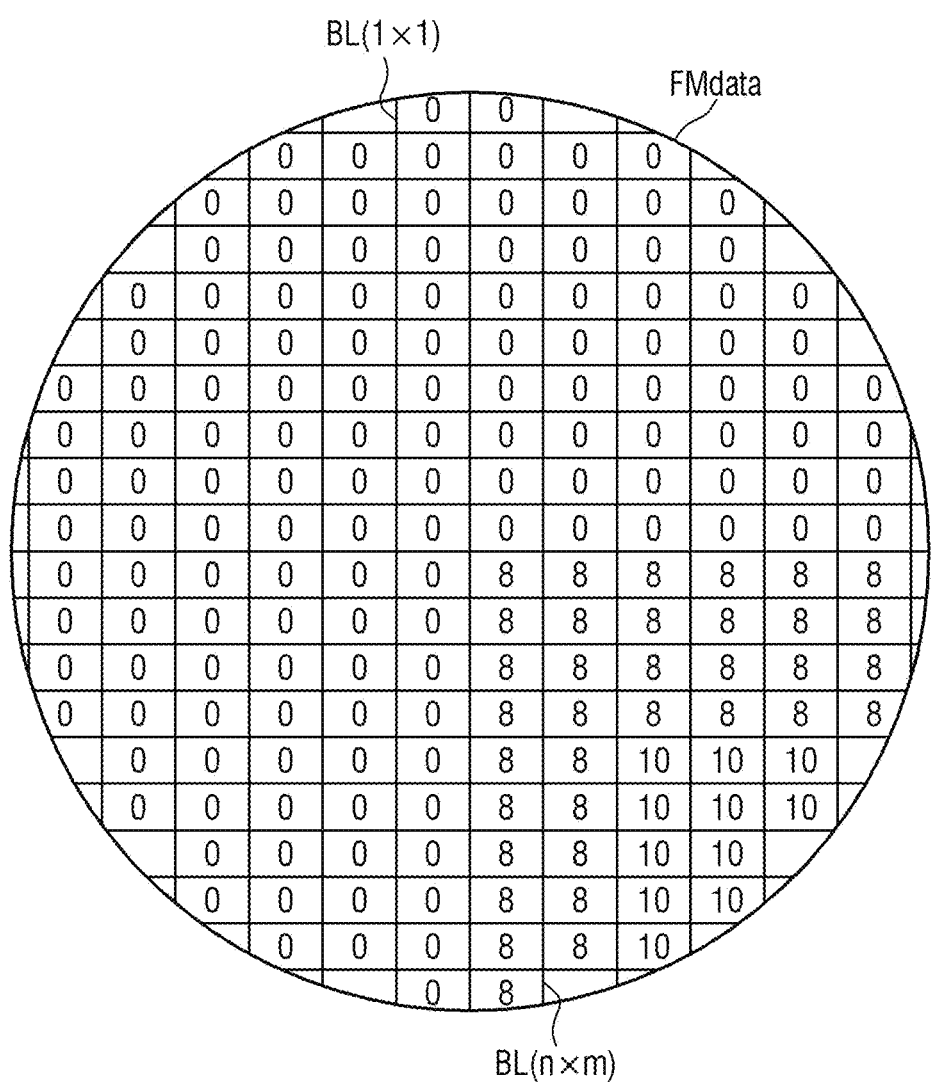
FIG. 15 is a diagram illustrating setting results of the compensation grayscale values for each block area of the liquid crystal image display unit.

FIG. 15 is a diagram illustrating setting results of the compensation grayscale values for each block area of the liquid crystal image display unit.

Referring to FIG. 15, the display driving circuit 220 receives the average value of image display grayscale for each of the block areas BL1 (1×1) to BL (n×m) detected by the light emitting detection device. The display driving circuit 220 generates and stores grayscale compensation value FMdata for each of the block areas BL1 (1×1) to BL (n×m) to respectively correspond to the image display grayscale average value deviation for each of the block areas BL1 (1×1) to BL (n×m). Here, the grayscale compensation value FMdata for each of the block areas BL1 (1×1) to BL (n×m) may be set as the difference value between the 128 grayscales which is the image display grayscale value of the liquid crystal pixels LSP and the average value of image display grayscale for each of the block areas BL1 (1×1) to BL (n×m).

Figure 16:
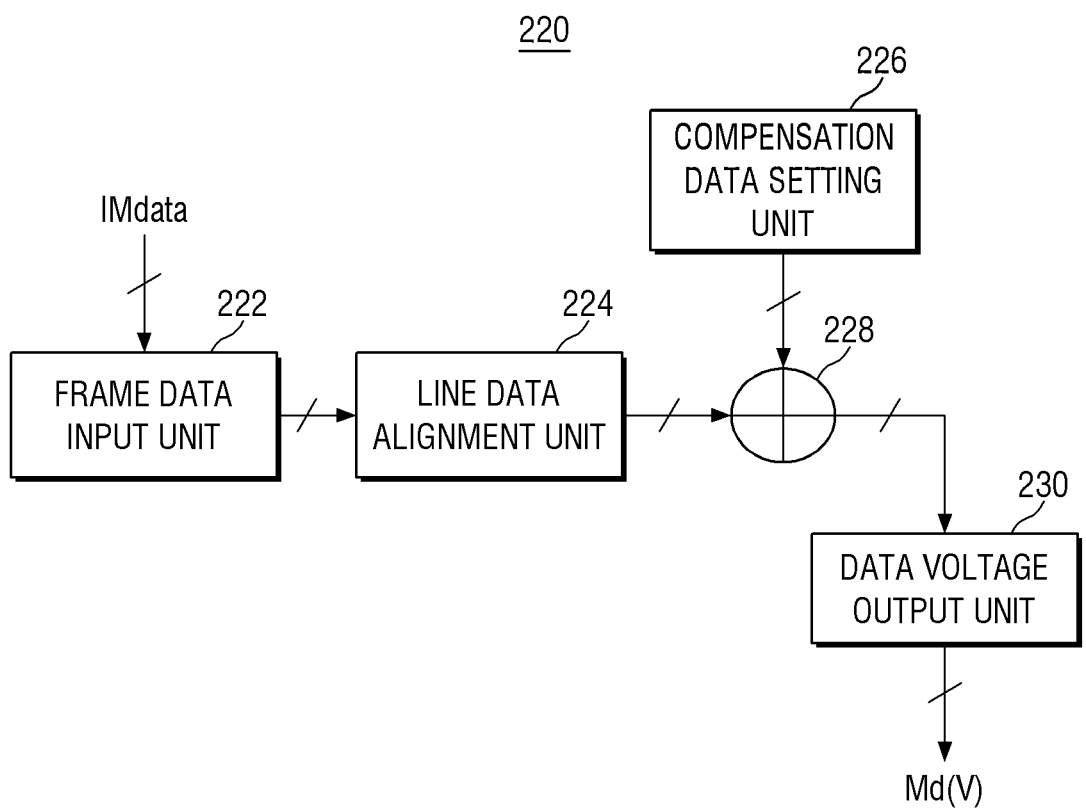
FIG. 16 is a configuration block diagram illustrating a detailed structure of the display driving circuit illustrated in FIG. 10.

FIG. 16 is a configuration block diagram illustrating a detailed structure of the display driving circuit illustrated in FIG. 10.

Referring to FIG. 16, the display driving circuit 220 may include a frame data input unit 222, a line data alignment unit 224, a compensation data setting unit 226, a second data compensation unit 228, and a data voltage output unit 230.

The frame data input unit 222 stores extended reality content image data IMdata with converted resolution in units of at least one frame. For example, the frame data input unit 222 may store and output image data IMdata sequentially input in at least one line or liquid crystal pixel LSP unit in at least one frame unit.

The line data alignment unit 224 aligns extended reality content image data IMdata stored in the frame data input unit 222 into the liquid crystal pixel LSP of at least one horizontal line unit of the liquid crystal image display unit DU2 and outputs the reality content image data IMdata to the second data compensation unit 228.

The compensation data setting unit 226 receives the average value of image display grayscale (or brightness value) for each of the preset block areas BL1 (1×1) to BL (n×m) detected by the light emitting detection device. A grayscale compensation value FMdata for each of the block areas BL1 (1×1) to BL (n×m) is generated and stored to respectively correspond to the deviation of the average value of image display grayscale for each of the block areas BL1 (1×1) to BL (n×m). As described above, the compensation data setting unit 226 may generate and store the compensation value FMdata for each of the block areas BL1 (1×1) to BL (n×m) to respectively correspond to the image display grayscale average value deviation for each of the block areas BL1 (1×1) to BL (n×m) of the liquid crystal image display unit DU2.

The second data compensation unit 228 sequentially calculates the grayscale compensation value FMdata for each of the block areas BL1 (1×1) to BL (n×m) on the image data IMdata for each liquid crystal pixel LSP in a preset calculation method to generate a compensation image data for each liquid crystal pixel LSP.

The second data compensation unit 228 calculates the grayscale compensation value FMdata for each of the block areas BL1 (1×1) to BL (n×m) of the compensation data setting unit 226 on the image data IMdata for each liquid crystal pixel LSP sequentially input from the frame data input unit 222 by adding or multiplying and generate the compensation image data for each liquid crystal pixel LSP.

The data voltage output unit 230 converts the corrected image data for each of the liquid crystal pixel LSP, for which the grayscale compensation value FMdata has been compensated, into an analog image signal and supplies it to the liquid crystal pixels LSP. The data voltage output unit 230 may convert the corrected image data into an image signal on horizontal line units of the liquid crystal image display unit DU2 and simultaneously supply the image signal to the liquid crystal pixels LSP of horizontal line units. Accordingly, the grayscale deviation for each of the block areas BL1 (1×1) to BL (n×m) of the liquid crystal image display unit DU2 can be compensated.

In concluding the detailed description, those skilled in the art will appreciate that many variations and modifications can be made to the disclosed embodiments without substantially departing from the principles of the disclosure. Therefore, the disclosed embodiments are used in a generic and descriptive sense only and not for purposes of limitation.

What is claimed is:

1. A display device comprising:
at least one spatial light modulator displaying an image;
a surface light source device providing an image display light from a rear direction of the at least one spatial light modulator to the at least one spatial light modulator as a background light; and
at least one image transmission member forming a display path of an image displayed through at least one spatial light modulator,
wherein the surface light source device comprises:
an organic light emitting display surface in which a plurality of light emitting pixels are disposed; and
an emission driving circuit setting a light emission compensation value for each of block areas of the organic light emitting display surface according to an average value of light emission grayscale deviation for each of the block areas of the organic light emitting display surface and compensating light emission grayscale in respect to the plurality of light emitting pixels by using the light emission compensation value for each of the block areas for driving.

2. The display device of claim 1, wherein
the emission driving circuit generates gate control signals and analog light emitting pixel voltages for driving the plurality of light emitting pixels simultaneously in at least one frame, and
the gate control signals are supplied to a first gate driver in the at least one frame, and the analog light emitting pixel voltages are supplied simultaneously to the plurality of light emitting pixels.

3. The display device of claim 2, wherein
the plurality of light emitting pixels comprises:
a plurality of pixel drivers receiving gate control signals at a same timing; and
light emitting elements emitting light by at least one pixel driver among the plurality of pixel drivers, and
the plurality of pixel drivers are supplied with the gate control signals and the light emitting pixel voltage from the emission driving circuit at a same timing and emits light of the light emitting elements simultaneously.

4. The display device of claim 3, wherein
the light emitting elements are electrically connected in parallel to the plurality of the pixel drivers to emit light by drive of the plurality of pixel drivers, and
the plurality of pixel drivers are supplied with the same gate control signals and the same analog light emitting pixel voltages through the emission driving circuit and the first gate driver at a same driving timing to emit light of the light emitting elements.

5. The display device of claim 3, wherein each of the light emitting elements included in the plurality of light emitting pixels is disposed on the organic light emitting display surface in at least any one of a substantially concentric circle shape, a substantially sector shape, a substantially triangular shape, a substantially rhombus shape, a substantially quadrangular shape, a substantially circular shape, a substantially semicircular shape, and a substantially elliptical shape or formed in a combination of different shapes.

6. The display device of claim 3, wherein each of the light emitting elements included in the plurality of light emitting pixels is disposed in a substantially concentric circle shape in plan view, surrounding the center of the organic light emitting display surface or is disposed in a substantially quadrangular shape in plan view, surrounding the center of the of the organic light emitting display surface in substantially quadrangular shape.

7. The display device of claim 3, wherein
at least three light emitting pixels respectively displaying red, green, and blue lights form each of unit light emitting pixels emitting white light, each of the unit light emitting pixels is alternately and repetitively disposed on the organic light emitting display surface, and in each of the unit light emitting pixels, at least three light emitting pixels formed in at least one of a substantially concentric circle shape, a substantially sector shape, a substantially triangular shape, a substantially rhombus shape, a substantially rectangular shape, and a substantially square shape are combined with each other.

8. The display device of claim 1, wherein the emission driving circuit receives an average value of light emission grayscale for each block area in respect to the block areas of the organic light emitting display surface from an external light emitting detection device, generates a light emission compensation value for each block area according to the light emission grayscale average value deviation for each block area of the organic light emitting display surface, compensates a grayscale value of extended reality content image data for each block area with the light emission compensation value for each block area, and converts into an analog light emitting pixel voltage and supply the analog light emitting voltage to the plurality of light emitting pixels.

9. The display device of claim 8, wherein the emission driving circuit comprises:

a light emitting pixel data alignment part aligning the extended reality content image data for at least one light emitting pixel of a horizontal line unit of the organic light emitting display surface or each light emitting pixel;

a light emitting compensation data storage part receiving an average value of light emission grayscale or brightness value for each block area detected by the light emitting detection device and generating the light emission compensation value for each block area to correspond respectively to the average value of light emission grayscale deviation or brightness value for each block area;

a first data compensation part sequentially calculating the light emission compensation value for each block area on the extended reality content image data for each light emitting pixel in a preset calculation method to generate a compensation image data for each light emitting pixel; and a light emitting data voltage generator converting compensation image data for each light emitting pixel with compensated light emission compensation value into an analog light emitting pixel voltage and supplying the analog light emitting pixel voltage to the light emitting pixels.

10. The display device of claim 1, wherein the at least one spatial light modulator comprises:

a liquid crystal image display part displaying extended reality content image through at least one image transmission member using a background light provided from the surface light source device; and a display driving circuit setting an image grayscale compensation value for each block area according to a grayscale average value deviation for each block area of the liquid crystal image display part and compensating the image grayscale in respect to liquid pixels aligned in the liquid crystal image display part to drive the liquid crystal pixels by using the image grayscale compensation value for each block area.

11. The display device of claim 10, wherein the display driving circuit receives a grayscale average value of display image for each block area in respect to the block areas of the liquid crystal image display part from an external light emitting detection device, generates image grayscale compensation value for each block area according to a grayscale average value deviation of for each block area of the liquid crystal image display part, compensates a grayscale value of extended reality content image data for each block area with an image grayscale compensation value for each block area, and converts into an analog image signal and supply the analog image signal to liquid pixels of the liquid crystal image display part.

12. The display device of claim 10, wherein the display driving circuit comprises:

a line data alignment part aligning extended reality content image data for at least one liquid crystal pixel of a horizontal line part of the liquid crystal image display part or each of the liquid crystal pixels;

a compensation data setting part generating and storing the grayscale compensation value for each block area to respectively correspond to a deviation of a brightness value or an image display grayscale average value for each block area;

a second data compensation part calculating the grayscale compensation value for each block area on the extended reality content image data for each liquid crystal pixel in a preset calculation method to generate a compensation image data for each liquid crystal pixel; and a data voltage output part converting a corrected image data for each liquid crystal pixel, for which the grayscale compensation value has been compensated, into an analog image signal and supplying the analog image signal to the liquid crystal pixels.

13. A display device comprising:

at least one spatial light modulator displaying an image;

a surface light source device providing an image display light from a rear direction of the at least one spatial light modulator to the at least one spatial light modulator as a background light; and at least one image transmission member forming a display path of an image displayed through at least one spatial light modulator, wherein the at least one spatial light modulator comprises:

a liquid crystal image display part displaying extended reality content image through at least one image transmission member using a background light provided from the surface light source device; and a display driving circuit setting an image grayscale compensation value for each block area according to a grayscale average value deviation for each block area of the liquid crystal image display part and compensating the image grayscale in respect to liquid pixels aligned in the liquid crystal image display part to drive the liquid crystal pixels by using the image grayscale compensation value for each block area.

14. The display device of claim 13, wherein the display driving circuit receives a grayscale average value of display image for each block area in respect to the block areas of the liquid crystal image display part from an external light emitting detection device, generates image grayscale compensation value for each block area according to a grayscale average value deviation of for each block area of the liquid crystal image display part, compensates a grayscale value of extended reality content image data for each block area with an image grayscale compensation value for each block area, and converts into an analog image signal and supply the analog image signal to liquid pixels of the liquid crystal image display part.

15. The display device of claim 14, wherein the display driving circuit comprises:
- a line data alignment part aligning the extended reality content image data for at least one liquid crystal pixel of a horizontal line part of the liquid crystal image display part or each of the liquid crystal pixels;
- a compensation data setting part generating and storing the grayscale compensation value for each block area to respectively correspond to a deviation of a brightness value or an image display grayscale average value for each block area;
- a second data compensation part calculating the grayscale compensation value for each block area on the extended reality content image data for each liquid crystal pixel in a preset calculation method to generate a compensation image data for each liquid crystal pixel; and
- a data voltage output part converting a corrected image data for each liquid crystal pixel, for which the grayscale compensation value has been compensated, into an analog image signal and supplying the analog image signal to the liquid crystal pixels.

16. The display device of claim 13, wherein the surface light source device comprises:
- an organic light emitting display surface in which a plurality of light emitting pixels performing surface emission is aligned; and
- an emission driving circuit setting a light emission compensation value for the each of the block areas according to the grayscale average value deviation of for each of the block areas of the organic light emitting display surface and compensating light emission grayscale in respect to the plurality of light emitting pixels by using the emission compensation value for each of the block areas for driving.

17. The display device of claim 16, wherein the emission driving circuit receives an average value of light emission grayscale for each block area in respect to the block areas of the organic light emitting display surface from an external light emitting detection device, generates a light emission compensation value for each block area according to a light emission grayscale average value deviation for each block area of the organic light emitting display surface, compensates a grayscale value of extended reality content image data for each block area with the light emission compensation value for each block area, and converts into an analog light emitting pixel voltage and supply the analog light emitting voltage to the plurality of light emitting pixels.

18. The display device of claim 17, wherein the emission driving circuit comprises:
- a light emitting pixel data alignment part aligning the extended reality content image data for at least one light emitting pixel of horizontal line unit of the organic light emitting surface or each of the light emitting pixels;
- a light emitting compensation data storage part receiving an average value of light emission grayscale or brightness value for each block area detected by the light emitting detection device and generating the light emission compensation value for each block area to correspond respectively to the average value of light emission grayscale deviation or brightness value for each block area;
- a first data compensation part sequentially calculating the light emission compensation value for each block area on the extended reality content image data for each light emitting pixel in a preset calculation method to generate a compensation image data for each light emitting pixel; and
- a light emitting data voltage generator converting compensation image data for each light emitting pixel with compensated light emission compensation value into an analog light emitting pixel voltage and supplying the analog light emitting pixel voltage to the light emitting pixels.

* * * * *